United States Patent
Tian et al.

(10) Patent No.: US 11,313,869 B2
(45) Date of Patent: Apr. 26, 2022

(54) METHODS AND APPARATUS FOR DETERMINING LABEL COUNT DURING SPECIMEN CHARACTERIZATION

(71) Applicants: Siemens Healthcare Diagnostics Inc., Tarrytown, NY (US); Jiang Tian, Beijing (CN); Stefan Kluckner, Berlin (DE); Shanhui Sun, Princeton, NJ (US); Yao-Jen Chang, Princeton, NJ (US); Terrence Chen, Princeton, NJ (US); Benjamin S. Pollack, Jersey City, NJ (US)

(72) Inventors: Jiang Tian, Beijing (CN); Stefan Kluckner, Berlin (DE); Shanhui Sun, Princeton, NJ (US); Yao-Jen Chang, Princeton, NJ (US); Terrence Chen, Princeton, NJ (US); Benjamin S. Pollack, Jersey City, NJ (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 306 days.

(21) Appl. No.: 16/604,132

(22) PCT Filed: Apr. 13, 2017

(86) PCT No.: PCT/CN2017/080445
§ 371 (c)(1),
(2) Date: Oct. 9, 2019

(87) PCT Pub. No.: WO2018/188023
PCT Pub. Date: Oct. 18, 2018

(65) Prior Publication Data
US 2020/0158745 A1 May 21, 2020

(51) Int. Cl.
*G06K 9/00* (2006.01)
*G01N 35/00* (2006.01)
(Continued)

(52) U.S. Cl.
CPC ..... *G01N 35/00732* (2013.01); *G06K 7/1413* (2013.01); *G06K 9/2027* (2013.01);
(Continued)

(58) Field of Classification Search
CPC ... G01N 35/00732; G01N 2035/00752; G01N 2035/00772; G06K 7/1413; G06K 9/2027;
(Continued)

(56) References Cited

U.S. PATENT DOCUMENTS 6,728,391 B1 * 4/2004 Wu .......................... B07C 1/00
209/583
8,310,658 B2  11/2012 Wardlaw et al.
(Continued)

FOREIGN PATENT DOCUMENTS

CN   105324671 A   2/2016
CN   105378453 A   3/2016
(Continued)

OTHER PUBLICATIONS

Supplementary EP Search Report dated Mar. 20, 2020 of corresponding European Application No. 17905386.3, 4 Pages.
(Continued)

*Primary Examiner* — Avinash Yentrapati

(57) ABSTRACT

A method of characterizing a serum and plasma portion of a specimen in regions occluded by one or more labels. The characterization may be used for Hemolysis, Icterus, and/or Lipemia, or Normal detection. The method captures one or more images of a labeled specimen container including a serum or plasma portion, processes the one or more images to provide segmentation data and identification of a label-containing region, and classifying the label-containing region with a convolutional neural network (CNN) to provide a pixel-by-pixel (or patch-by-patch) characterization of
(Continued)

the label thickness count, which may be used to adjust intensities of regions of a serum or plasma portion having label occlusion. Optionally, the CNN can characterize the label-containing region as one of multiple pre-defined label configurations. Quality check modules and specimen testing apparatus adapted to carry out the method are described, as are other aspects.

20 Claims, 11 Drawing Sheets

(51) Int. Cl.
*G06K 7/14* (2006.01)
*G06K 9/20* (2006.01)
*G06K 9/32* (2006.01)
*G06K 9/34* (2006.01)
*G06K 9/62* (2022.01)
*G06K 19/06* (2006.01)

(52) U.S. Cl.
CPC .............. *G06K 9/325* (2013.01); *G06K 9/34* (2013.01); *G06K 9/627* (2013.01); *G06K 19/06028* (2013.01); *G01N 2035/00752* (2013.01); *G01N 2035/00772* (2013.01)

(58) Field of Classification Search
CPC .......... G06K 9/325; G06K 9/34; G06K 9/627; G06K 19/06028
See application file for complete search history.

(56) References Cited

U.S. PATENT DOCUMENTS

| | | | |
|---|---|---|---|
| 8,818,023 B2 * | 8/2014 | Carpenter .......... | G06K 9/00449 382/101 |
| 9,322,761 B2 | 4/2016 | Miller | |
| 10,325,182 B2 | 6/2019 | Soomro et al. | |
| 10,746,665 B2 | 8/2020 | Kluckner et al. | |
| 10,746,753 B2 | 8/2020 | Kluckner et al. | |
| 10,816,538 B2 | 10/2020 | Kluckner et al. | |
| 10,824,832 B2 | 11/2020 | Kluckner et al. | |
| 11,009,467 B2 | 5/2021 | Park et al. | |
| 11,022,620 B2 | 6/2021 | Kluckner et al. | |
| 11,035,870 B2 * | 6/2021 | Kluckner .............. | G06K 9/6269 |
| 11,037,017 B2 * | 6/2021 | Deng ................... | G06K 9/3241 |
| 11,042,788 B2 | 6/2021 | Kluckner et al. | |
| 2013/0076882 A1 | 3/2013 | Itoh | |
| 2018/0045654 A1 * | 2/2018 | Park ........................ | G01J 3/462 |
| 2019/0033209 A1 | 1/2019 | Kluckner et al. | |
| 2019/0128908 A1 * | 5/2019 | Nakagawa ....... | G01N 35/00732 |

FOREIGN PATENT DOCUMENTS

| | | | |
|---|---|---|---|
| DE | 102014224519 A1 | 6/2016 | |
| JP | H07-122245 A | 5/1995 | |
| JP | 2004-037322 A | 2/2004 | |
| JP | 2006-010453 A | 1/2006 | |
| JP | 2008-026036 A | 2/2008 | |
| JP | 2011027661 A | 2/2011 | |
| JP | 2012-159318 A | 8/2012 | |
| JP | 2015-040696 A | 3/2015 | |
| JP | 2016-008927 A | 1/2016 | |
| JP | 2018-511787 A | 4/2018 | |
| JP | 2019-504994 A | 2/2019 | |
| JP | 2019-510963 A | 4/2019 | |
| JP | 2020-516885 A | 6/2020 | |
| JP | 2020-519853 A | 7/2020 | |
| WO | 2010/140252 A1 | 12/2010 | |
| WO | 2014/031576 A1 | 2/2014 | |
| WO | 2016/133900 A1 | 8/2016 | |

OTHER PUBLICATIONS

Robin A Felder: "Automated Specimen Inspection, Quality Analysis, and Its Impact on Patient Safety: Beyond the Bar Code", Clinical Chemistry, vol. 60, No. 3, Mar. 1, 2014 (Mar. 1, 2014), pp. 433-434, XP055672007, ISSN: 0009-9147, DOI: 10.1373/clinchem.2013.219352 *the whole document*.
PCT International Search Report and Written Opinion dated Jan. 17, 2018 (11 Pages).
Chou Tzu-Han et al: "QR Code Detection Using Convolutional Neural Networks"; XP033176779.

* cited by examiner

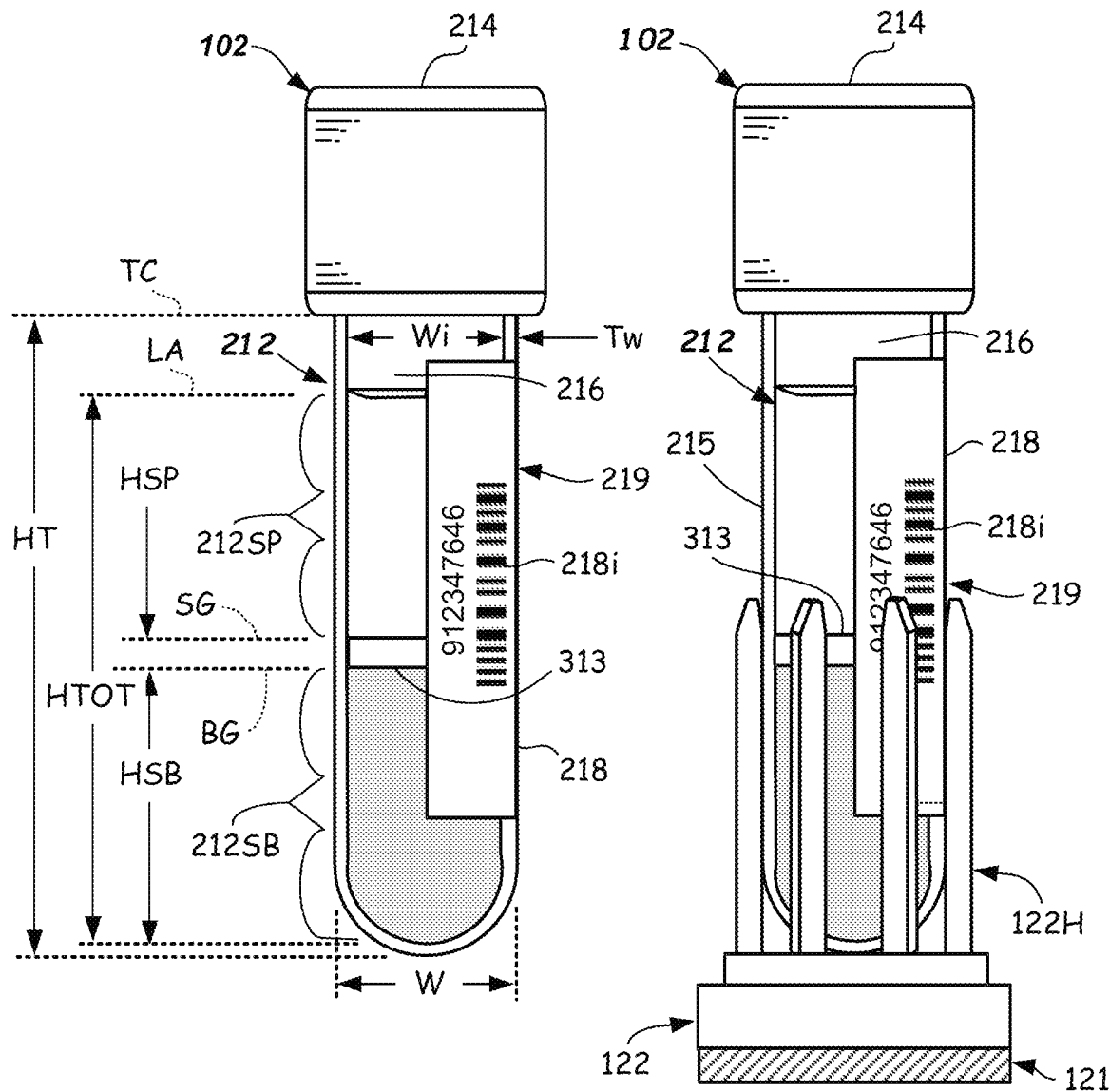
*FIG. 2B*  *FIG. 3A*

METHODS AND APPARATUS FOR DETERMINING LABEL COUNT DURING SPECIMEN CHARACTERIZATION

FIELD

The present disclosure relates to methods and apparatus for characterizing a specimen container and specimen, and, more particularly to methods and apparatus for determining if a specimen includes hemolysis (H), icterus (I), and/or lipemia (L), or is normal (N).

BACKGROUND

Automated testing systems can be used to conduct clinical chemistry or assay testing using one or more reagents to identify an analyte or other constituent in a specimen such as urine, blood serum, blood plasma, interstitial liquid, cerebrospinal liquid, or the like. For convenience and safety reasons, these specimens may be contained within specimen containers (e.g., blood collection tubes). The assay or test reactions generate various changes that may be read and/or manipulated to determine a concentration of analyte or other constituent present in the specimen. Such specimen containers may have one and sometimes more than one label provided thereon. The label(s) may be a manufacturer's label and/or a label including identifying information aiding in the identification of the specimen and possibly tests to be performed thereon. In most instances, at least one of the labels includes identifying information as a barcode (hereinafter a "barcode label"). The labels may be paper labels with adhesive backing, for example. However, other label types are possible. Combinations of manufacturer's label and one or more barcode labels may be present. In some cases, a gel separator may be added to the specimen container to aid in the separation of the settled blood portion from the serum or plasma portion during centrifugation.

Improvements in automated testing technology have been accompanied by corresponding advances in pre-analytical specimen preparation and handling operations such as sorting, batch preparation, centrifuging of specimen containers to separate specimen constituents, cap removal to facilitate specimen access, and aliquot preparation, by automated systems that may be part of a Laboratory Automation System (LAS). The LAS may automatically transport specimens in the specimen containers to one or more pre-analytical specimen processing stations as well as to one or more analyzer stations containing clinical chemistry analyzers and/or assay instruments (hereinafter collectively "analyzers").

The LAS may handle processing of a number of different specimens at one time, and may use the barcode label for tracking and routing. The barcode label may code an accession number that may be correlated to demographic information that may be entered into a hospital's Laboratory Information System (LIS) along with test orders and/or other information. An operator may place the labeled specimen containers onto the LAS system, which interfaces with the LIS, and may automatically route the specimen containers for one or more pre-analytical operations; all of which may be prior to the specimen actually being subjected to clinical analysis or assaying by one or more analyzers that may be part of the LAS.

After fractionation and subsequent pre-analytical processing, the specimen container may be transported to an appropriate analyzer that may extract, via aspiration, serum or plasma portion from the specimen container and combine the serum or plasma portion with one or more reagents in a reaction vessel (e.g., cuvette or other vessel). Analytical measurements may then be performed, often using a beam of interrogating radiation, for example, or by using photometric or fluorometric absorption readings, or the like. The measurements allow determination of end-point or rate values, from which a concentration of analyte or other constituent may be determined using well-known techniques.

Unfortunately, the presence of any interferent (e.g., H, I, and/or L) in the specimen, as a result of a patient condition or sample processing, may possibly adversely affect the test results of the analyte or constituent measurement obtained from the one or more analyzers. For example, the presence of hemolysis in the specimen, which may be unrelated to the patient disease state, may cause a different interpretation of the disease condition of the patient. Moreover, the presence of icterus and/or lipemia in the specimen may also cause a different interpretation of the disease condition of the patient.

In some prior art systems, the integrity of the serum or plasma portion of the specimen may be visually inspected and rated for a degree of H, I, and/or L (e.g., by assigning an index) or normal (N) by a skilled laboratory technician. This may involve a review of the color of the serum or plasma portion against known standards. A normal (N) serum or plasma portion has a light yellow to light amber color. Serum or plasma portion containing hemolysis (H) has a reddish color. Serum or plasma portion containing icterus (I) has a dark yellow color due to increased bilirubin, and serum or plasma portion containing lipemia (L) has a whitish or milky appearance. Depending on the color, the laboratory technician may assign an index value. However, such visual inspection by a person is very subjective, labor intensive, and fraught with the possibility of human error.

Because manual inspection includes the problems listed above, efforts have been undertaken to evaluate the integrity of the specimen without the use of visual inspection by a laboratory technician, but rather by using an automated, machine-vision inspection method that takes place as pre-analytical testing (hereinafter "pre-screening"). The pre-screening involves automated detection of an interferent, such as H, I, and/or L, in a serum or plasma portion obtained from whole blood by fractionation (e.g., by centrifugation).

However, in some instances, one or more of the above-described labels may be provided (e.g., adhered) directly to the specimen container. Such label(s) may partially occlude and obscure certain lateral viewpoints of the specimen, so that there may be only one rotational orientation that provides a clear opportunity to visually observe the serum or plasma portion. Thus, automation of such pre-analytical testing has included, for example, rotationally orienting the specimen in such a way that allows for automated pre-screening for H, I, and/or L or N.

For example, in some prior art systems, such as those described in U.S. Pat. No. 9,322,761 to Miller entitled "Methods And Apparatus For Ascertaining Interferents And Physical Dimensions in Liquid Samples And Containers To Be Analyzed By A Clinical Analyzer" the specimen container is rotated to find a view window that is unobstructed by the label and the imaging is then carried out. However, such systems may be less easily automated, and may have other problems. For example, in some instances, only a small portion of the serum or plasma portion may be visible, so that any reading taken on the serum or plasma portion to determined H, I, and/or L or N may not involve a high confidence level. Furthermore, in some embodiments, multiple overlapping labels may completely obscure the view of the specimen (e.g., wrap 360 degrees about the girth) of the specimen container.

Accordingly, there is an unmet need for a method and apparatus adapted to characterize a serum or plasma portion of a specimen, so as to be able to more accurately determine a presence of H, I, and/or L or N and possibly an extent thereof when the serum or plasma portion is partially or fully occluded (obscured) by one or more labels.

SUMMARY

According to a first aspect, a characterization method is provided. The characterization method includes capturing images of a specimen container including a serum or plasma portion of a specimen, the specimen container including one or more labels provided thereon, processing the images to provide segmentation data including identification of a label-containing region, classifying the segmentation data on the label-containing region with a convolutional neural network, and outputting from the convolutional neural network one or more of:

per pixel data (or per patch data) on label thickness count, and characterization of the label-containing region as one or more of pre-defined label configurations.

According to another aspect, a quality check module is provided. The quality check module includes a plurality of image capture devices arranged around an imaging location, and configured to capture multiple images of a specimen container, including one or more labels and containing a serum or plasma portion of a specimen, from multiple viewpoints, and a computer coupled to the plurality of image capture devices and adapted to process image data of the multiple images, the computer configured and capable of being operated to: capture images of the specimen container, the serum or plasma portion, and the one or more labels, process the images to provide segmentation data including identification of a label-containing region, classify the label-containing region with a convolutional neural network, and output from the convolutional neural network one or more of: per pixel data (or per patch data) on label thickness count, and characterization of the label-containing region as one or more of pre-defined label configurations.

In another aspect, a specimen testing apparatus adapted to determine presence of an interferent in a specimen contained within a specimen container is provided. The specimen testing apparatus includes a track, a carrier moveable on the track and configured to contain a specimen container containing a serum or plasma portion of a specimen, the specimen container including one or more labels thereon, a plurality of image capture devices arranged around the track and configured to capture multiple images of a specimen container, the one or more labels, and the serum or plasma portion of the specimen, from multiple viewpoints, and a computer coupled to the plurality of image capture devices and adapted to process image data of the multiple images, the computer configured and capable of being operated to: capture images of the specimen container, the serum or plasma portion, and the one or more labels, process the images to provide segmentation data including identification of a label-containing region, classify the label-containing region with a convolutional neural network, and output from the convolutional neural network one or more of: per pixel data (or per patch data) on label thickness count, and characterization of the label-containing region as one or more of pre-defined label configurations.

Still other aspects, features, and advantages of the present disclosure will be readily apparent from the following description by illustrating a number of example embodiments and implementations, including the best mode contemplated for carrying out the present invention. The present invention may also be capable of other and different embodiments, and its several details may be modified in various respects, all without departing from the scope of the present invention. The disclosure is intended to cover all modifications, equivalents, and alternatives falling within the scope of the appended claims.

BRIEF DESCRIPTION OF THE DRAWINGS

The drawings, described below, are for illustrative purposes and are not necessarily drawn to scale. Accordingly, the drawings and descriptions are to be regarded as illustrative in nature, and not as restrictive. The drawings are not intended to limit the scope of the invention in any way.

FIG. 2B illustrates a side view of a specimen container including a barcode label, a separated specimen including a serum or plasma portion containing an interferent, and a gel separator.

FIG. 3A illustrates a side view of a specimen container including a barcode label, a separated specimen containing an interferent in the serum or plasma portion, a gel separator, and wherein the specimen container is shown being held in an upright orientation in a holder of a carrier.

DETAILED DESCRIPTION

Figure 1:
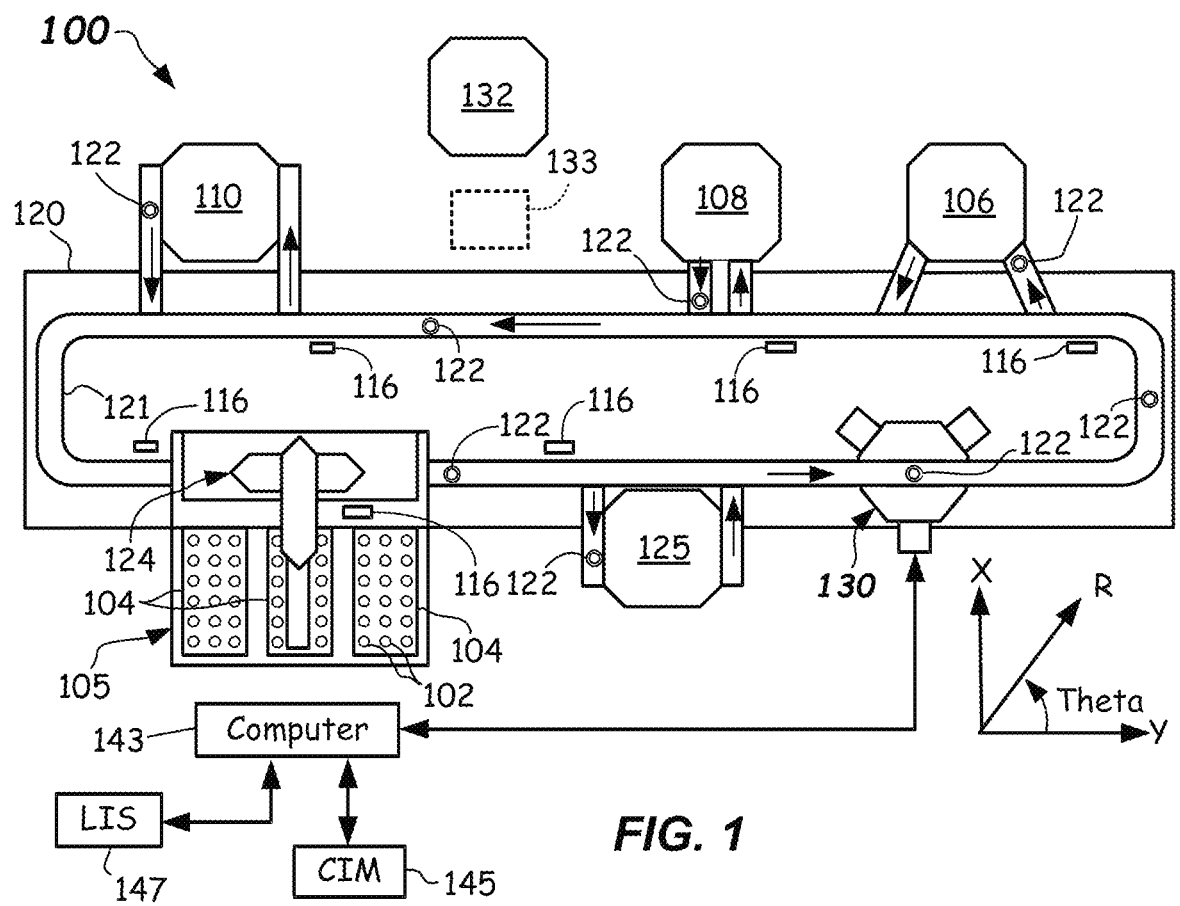
FIG. 1 illustrates a top schematic view of a specimen testing apparatus including one or more quality check modules configured to carry out characterization methods described herein according to one or more embodiments.

During pre-screening of a specimen contained in a specimen container, such as at a quality check module, a method is provided that classifies various regions of the specimen container and specimen. In particular, the serum and plasma portion is desired to be identified (classified) and differentiated from other regions, such as settled blood portion, gel separator (if used), one or more labels, the specimen container (e.g., tube) itself, air, cap, or even holder. Differentiation of the serum and plasma portion from the region comprising one or more labels (hereinafter label-containing region) is a particularly vexing problem because one or more labels may wrap around the specimen container to various degrees, and may include one, two, or even three or more labels adhered overtop of one another (which may be overlying or overlapping to some extent). In some cases, the labels may overlap one another in a manner so that the layer thickness may be different in various sub-regions of the layer-containing region. Thus, some sub-regions of the label-containing region may include one, two, three or even more layer thickness counts. Thus, the one or more labels may obscure one or more views, and in some cases all views of the serum or plasma portion, such that a clear view of the serum or plasma portion may be difficult to obtain. Moreover, the areas being obscured and include one or more label thicknesses.

Thus, classification of the serum or plasma portion may be quite challenging due to interference from the one or more labels, whose placement and number (label count) may vary substantially from one specimen container to the next being pre-screened. In particular, the obstruction caused by the one or more labels may heavily influence the spectral responses, such as from various viewpoints, given that the one or more labels may appear on one side, both opposing sides, or even all around the specimen container, and may involve multiple layer thicknesses (multiple thickness counts) provided in various sub-regions.

Accordingly, given the challenges described above, in a first broad aspect, embodiments of the present disclosure provide methods, apparatus, and systems configured to determine the presence of one or more labels, and characterization of a configuration thereof. This involves identifying a label count, i.e., a number of labels that are present on the specimen container, and/or may also identify other aspects, such as identifying a label configuration. For example, the label count on the specimen container may be quantified. Optionally or additionally, for the identified label-containing region, those sub-regions constituted as including one and only one label layer may be identified. Likewise, those sub-regions of the label-containing region containing two label layers, i.e., that are overlapping so that two label layer thicknesses counts are present therein can be identified. Similarly, those label-containing sub-regions including three label thicknesses can be identified on specimen containers including three or more labels. Other label configurations or label features may be identified. For example, specimen containers that are fully visually (by the naked eye) occluded by labels may be identified. Moreover, if the level of labeling is determined by the method to be so substantial so as to reduce confidence in the H, I, and/or L, or N characterization of the serum or plasma portion, then the operator may be notified or the specimen may otherwise rejected. After this, the method may include remediation, such as a specimen transfer to another specimen container having fewer labels (e.g., one barcode-containing label).

Additionally, given the presence of the label, the methods, apparatus, and systems may allow for suitable adjustments to the spectral responses so that the influence of the label(s) may be more effectively removed or otherwise compensated for. For example, output from the characterization method may provide a pixel-by-pixel (or patch by patch) label count for the label-containing region, i.e., for each pixel or patch, how many layers (layer thickness counts) of label are present. Patch as used herein may also be described as a superpixel, i.e., a grouping of pixels (such as having pixel× pixel dimensions of 11×11, 5×5, 3×3, 2×2, and the like, for example). This label layer count output data may be used to encode a layer of an overall representation input to an HILN classifier in order to account for or adjust intensity data for the presence of the number of labels in the background and/or foreground of any selected viewpoint. As a result, more effective classification of the serum or plasma region may be available in cases where label obstruction is present, and the confidence in the intensity readings for those regions of the serum or plasma portion that are occluded by label can be improved. Thus, improved confidence in a determination of, and the extent of, H, I, and/or L, or a determination of N of the serum or plasma portion may be achieved.

In accordance with another aspect, the characterization method can be carried out by a quality check module and specimen testing apparatus using a CNN. The CNN may include convolution layers and pooling layers to extract low level features. The low level features may include local, intermediate, and global features of the one or more labels. Fully-connected layers (inner products) may be used to provide correlation between parts of the labels. The output of the last fully-connected layer produces a distribution over all the possible multiple label configuration options as a single label configuration, or as an output vector. Label configuration output options may include, for example, whether a manufacturer's label is present, whether a barcode label is present, whether both a barcode label and a manufacturer's label are present, whether the serum or plasma portion of the specimen is totally occluded from one or more viewpoints, and the like. Other possibilities are discussed herein.

Definitions

"Interferent," as used herein, means the presence of at least one of hemolysis (H), icterus (I), or lipemia (L) in the serum or plasma portion of the specimen. Hemolysis (H), icterus (I), and lipemia (L) are collectively referred to as "HIL" herein.

"Hemolysis" is defined as a condition in the serum or plasma portion wherein during processing red blood cells are destroyed, which leads to the release of hemoglobin from the red blood cells into the serum or plasma portion such that the serum or plasma portion takes on a reddish hue. The degree of Hemolysis may be quantified by assigning a Hemolytic Index.

"Icterus" is defined as a condition of the blood where the serum or plasma portion is discolored dark yellow caused by an accumulation of bile pigment (bilirubin). The degree of Icterus may be quantified by assigning an Icteric Index.

"Lipemia" is defined as a presence in the blood of an abnormally high concentration of emulsified fat, such that the serum or plasma portion includes a whitish or milky appearance. The degree of lipemia may be quantified by assigning a Lipemic Index.

"Serum or plasma portion" is the liquid component of blood. It is found above the settled blood portion after fractionation (e.g., by centrifugation). Plasma and serum differ in the content of coagulating components, primarily fibrinogen. Plasma is the un-clotted liquid, whereas serum refers to blood plasma, which has been allowed to clot either under the influence of endogenous enzymes or exogenous components.

"Settled blood portion" is a packed semi-solid made up blood cells such as white blood cells (leukocytes), red blood cells (erythrocytes), and platelets (thrombocytes), which are aggregated and separated from the serum or plasma portion. The settled blood portion is found at a bottom part of the specimen container below the serum or plasma portion after fractionation.

"Image capture device" is any device capable of capturing a pixelated image (e.g., digital image) for analysis, such as a digital camera, a CCD (charge-coupled device) and CMOS (complementary metal-oxide semiconductor), an array of sensors, or the like.

"Pixelated image" as used herein means images including either single pixels or a grouping of pixels, such as a super-pixel or image patch (patch) including more than one pixel.

"Label" is defined as an area on an outside surface of the specimen container adapted to contain identification information (i.e., indicia). The label may be an opaque paper, plastic, paint, or other material applied (e.g., adhered) to an outer surface of the specimen container. Indicia may be a barcode, alphabetic characters, numeric characters, or combinations thereof. The label may be manufacturer label or may be a label after-applied by a phlebotomist or by a subsequent specimen processing entity that may include a barcode.

"LA" is defined as the liquid-air interface and is a line of demarcation (viewed laterally) between the serum or plasma portion and the air above the serum or plasma portion.

"SB" is the serum-blood interface, which is a line of demarcation (viewed laterally) between the serum or plasma portion and the settled blood portion.

"TC" is the tube-cap interface, which is a line of demarcation (viewed laterally) at the interface between the air and the cap.

"HT" is the height of the tube and is defined as the height from the bottom-most part of the tube to the bottom of the cap.

"HSP," in cases where no gel separator is used, is the height of the serum or plasma portion and is defined as the height from the top of the serum or plasma portion from the top of the settled blood portion, i.e., from LA to SB.

"HSP," in cases where a gel separator is used (FIG. 2B), is the height of the serum or plasma portion and is defined as the height from the top of the serum or plasma portion at LA to the top of the gel separator at SG, i.e., from LA to SG.

"HSB," in cases where no gel separator is used, is the height of the settled blood portion and is defined as the height from the bottom of the settled blood portion to the top of the settled blood portion at SB.

"HSB," in cases where a gel separator is used, is the height of the settled blood portion and is defined as the height from the bottom of the settled blood portion to the bottom of the gel separator at BG.

"HTOT," in cases where there is no gel separator is used, is the total height of the specimen and equals HSP+HSB.

"HTOT," in cases where a gel separator is used, is a total height of the specimen, and equals HSP+HSB+height of the gel separator.

"Tw" is the wall thickness of the specimen container.

"W" is an outer width of the specimen container.

"Wi" is an inner width of the specimen container.

"Carrier" is a device that is configured to support and transport a specimen container, such as within a laboratory automation system (LAS).

"VSP" is a volume of the serum or plasma portion in the specimen container.

"VSB" is a volume of the settled blood portion in the specimen container.

"Hemolytic index" as used herein means a grade given to a particular specimen based upon the determined content (degree or amount) of hemolysis present in the serum or plasma portion.

"Icteric index" as used herein means the grade given to a particular specimen based upon a determined content (degree or amount) of icterus present in the serum or plasma portion.

"Lipemic index" as used herein means the grade given to a serum or plasma portion based upon the determined content (degree or amount) of lipemia present in the serum or plasma portion.

The presence of one or more interferent (H, I, and/or L) in the serum or plasma portion, as discussed above, may affect the interpretation of results in subsequent testing by the one or more analyzers (e.g. clinical chemistry or assay testing). Thus, the ability to pre-screen for H, I, and/or L, such as at the first possible instance after centrifugation and before analysis by one or more analyzers may advantageously minimize wasted time analyzing specimens that are not of the proper quality for analysis, may improve test results, may minimize patient test result delay, and may avoid wasting of specimen. Moreover, in one or more embodiments, remedial action can take place after pre-screening where H, I, and/or L are found.

The specimen, as described herein, may be collected in a specimen container, such as a blood collection tube and may include a settled blood portion and a serum and plasma portion after fractionation (e.g., separation by centrifugation). In some specimen containers, a small gel separator may be used, which positions itself between the settled blood portion and the serum or plasma portion during centrifugation. The gel separator serves as a physical barrier between the two portions (liquid and semi-solid, settled blood cells), and may minimize remixing thereof. The specimen containers may be of different sizes and thus may be supplied to the analyzers in a number of different configurations. For example, the specimen containers may have sizes such as 13 mm×75 mm, 13 mm×100 mm, 16 mm×100 mm, and 16 mm×125 mm, for example. Other suitable sizes may be used.

In accordance with one or more embodiments, the characterization method may provide a more detailed characterization of a label-containing region defined by the one or more labels. Thus, in one aspect, this improved characterization can be used to provide a better characterization of the serum or plasma portion that is occluded by the one or more labels. The improved label characterization may be used to provide a better classification of the serum or plasma portion in regions where the backlight is obscured by the label-containing region and, in turn, may improve the results of interferent detection methods and interferent quantification methods (i.e., index quantifying methods). In particular, in some embodiments the characterization method may provide information on a number of label layers (label thickness count) associated with each pixel (or patch) of segmentation data of the label-containing region. This additional data can encode an additional layer to help better guide the HILN classifier to compensate for the change is light intensity based on any image disturbance/occlusion caused by the label-containing region.

The methods may, in some embodiments, use high dynamic range (HDR) image processing of the specimen container and serum or plasma portion. In some embodiments, the identification of the physical boundaries of the serum or plasma portion and a label-containing region may also take place during a segmentation process by using HDR image processing as an input thereto.

In one or more embodiments, a quality check module may be configured to carry out the characterization methods. The quality check module may be provided in any suitable area where a robotic mechanism (e.g., a track or gripper-finger robot) may facilitate transport of specimens in specimen containers to the quality check module. In some embodiments, the quality check module may be provided on or along the track of a specimen testing apparatus, where the track carries the specimens to one or more remote locations of one or more analyzers for analysis (e.g., clinical chemistry testing or assaying) if pre-screening of the specimen determines it to be normal (N). In some embodiments, the quality check module may be provided directly on the track so that the characterization method and testing for the presence of an interferent can be accomplished while the specimen container is supported in a carrier being resident on the track. In embodiments, the specimen container may be held in an upright position by a specimen container holder (hereinafter "holder"), which may be part of a carrier. The holder may include fingers or other suitable articles that hold the specimen container during capture of the image data of the specimen and specimen container.

Should the specimen be found to contain one or more of H, I, and L, a suitable notice may be provided to the operator, and/or may be taken off line to perform a remediation to rectify the one or more of H, I, or L, for further quantification of H, I, or L to more accurately measure an extent of the interferent present, for a redraw of the specimen, or for other processing.

In some instances, where the characterization method determines that the specimen container is so occluded by labels that it is determined that the quality of the HILN characterization of the specimen may be suspect (e.g., too many labels), the operator may be notified via suitable notice (alarm, signal, screen prompt, or other suitable flag) so that the specimen may be removed or otherwise transferred to another specimen container to be pre-screened again, which may possibly involve re-fractionation.

The characterization and HILN detection methods described herein are image based, i.e., based on pixelated images (e.g., digital images). The images may be obtained by multiple image capture devices located so as to capture images from multiple viewpoints (e.g., lateral viewpoints). The multiple images may be obtained at the quality check module, and may be captured at multiple exposure times while providing illumination (e.g., backlighting) at multiple spectra having different nominal wavelengths. The multiple spectra of illumination may include, for example red (R), green (G), blue (B), white (W), IR, and near IR (NIR), for example. In some embodiments, only R, G, and B light sources are used. The illumination may include backlit illumination wherein the image capture device is located on one side and the backlight source is on an opposite side of the specimen container. The exposure time may be varied based upon the lighting intensity and spectrum used and features of the image capture devices. Multiple exposure times may be used for each spectrum and for each image capture device.

For each corresponding pixel of the multiple captured images at a particular spectrum (at different exposure times), pixels exhibiting optimal image intensity may be selected. The result may be a plurality of consolidated color image data sets for each different spectrum (e.g., R, G, B, W, IR, NIR, or any selected subset thereof) where all pixels are optimally exposed (e.g., one image data set per spectrum). The data from the consolidated image data sets may be subject to statistical analysis to determine statistical data on each pixel (e.g., mean, standard deviation, and covariance matrix) thereof. Covariance is a measure of how much two or more of the spectrally-illuminated pixels change together. This statistical data, in the form of one or more data matrices, can then be operated on by or more multi-class classifiers in order to segment the image data set into predefined classes (hereinafter "segmentation").

The segmentation may determine and identify the boundaries of the region of serum or plasma portion in the image, as well as classes of other regions (e.g., label-containing region, settled blood portion, gel separator, tube, cap, holder, and/or air). The multi-class classifier may be a support vector machine (SVM) or a random decision tree that has been pre-trained from multiple training sets. However, other types of segmentation may be employed, such as a convolutional neural network (CNN). Any suitable program, toolbox, or segmentation technique may be used for segmentation by carrying out classification and training tasks, such as Matlab, various C++ tools, or even cloud-based programs. Segmentation may be provided for processing the image data of the captured images and obtaining segmentation data on at least the serum or plasma portion and the label-containing portion (area including label(s)).

Once the label-containing region is appropriately identified, the associated data may be further processed according to the characterization method. In particular, a further characterization of the label-containing region is obtained by classifying the segmentation data on the label-containing region with a convolutional neural network (CNN). The CNN may output one or more of: per pixel data (or per patch data) on a label thickness count, and characterization of the label-containing region as being one or more pre-defined label configurations. The one or more pre-defined label configurations may include, for example different predefined structural configurations of the labels. For example, the one or more pre-defined label configurations may include a manufacturer's label, includes barcode label; includes barcode label and manufacturers label, label count=1, label count=2, label count=3, fully occluded by labels, and the like. Thus, one outcome of the characterization method may be a better understanding of the label configuration. This determination of one or more of these pre-defined label configurations may be used for making further decisions, such as rejecting a specimen container, transfer of specimen to a new container, providing an indication of the level of uncertainty in the end HILN characterization, and the like.

In another aspect, the characterization method may provide additional detail on the label-containing region. In particular, the characterization method may provide label thickness count data (e.g., on a pixel-by-pixel or patch-by-patch basis) to the interferent characterizer. This label thickness count data may be provided along with data on the serum and plasma region from segmentation and may be operated on by one or more interferent classifiers to directly classify the presence of an interferent (e.g., H, I, and/or L or normality (N)). The one or more interferent classifiers may be individually trained binary models that may classify each pixel (or patch) as being H, I, and/or L, or N, respectively. In other embodiments, the interferent classifier may be a multi-class classifier. The interferent classifier model(s) may also be a support vector machine (SVM) or a random decision tree. Optionally, the interferent classifier may be a CNN. Other suitable classifiers or representations may be used.

Although using the images from multiple viewpoints can provide suitably high confidence results in terms of properly characterizing HILN when a sufficient region of the serum or plasma portion is viewable and not occluded by label, it has been discovered by the inventors herein that the presence of the one or more labels on the specimen container can adversely affect the intensity values of the image captured. For example, if the label is located on the backside of the specimen container from one viewpoint, the presence of the label may obscure the back light that can pass through the serum or plasma portion and thus affect the image intensity that can be measured by the image capture device in the front view of that viewpoint. Embodiments of the present disclosure account not only for the presence of such label(s), but also may account for the relative label thicknesses (label thickness count) across the label-containing region. Thus, embodiments of the present disclosure provide for a better and more robust assessment of the image intensity for the serum or plasma portion from areas where label occlusion has occurred in that selected viewpoint. From this improved characterization, a more accurate determination of HILN may be provided.

Moreover, based upon the more accurate characterization of the label-containing region, an improved determination of interferent level (interferent index) for the various interferent type(s) may be provided. The interferent level (index) may be based upon one or more additional models (e.g., one or more regression or other models), for example. The regression models may be trained for each interferent type based upon sample HIL specimens that exhibit diverse interference levels. More than one interferent type may be determined by the interferent level detection method, and an interferent index for each interferent type (e.g., HIL) may be specified, if present.

Further details of inventive characterization methods, quality check modules configured to carry out the characterization methods, and specimen testing apparatus including one or more quality check modules will be further described with reference to FIGS. 1-7 herein.

FIG. 1 illustrates a specimen testing apparatus 100 capable of automatically processing multiple specimen containers 102 (e.g., see FIGS. 2A-3E) each containing a specimen 212. The specimen containers 102 may be provided in one or more racks 104 provided at a loading area 105 prior to transportation to, and analysis by, one or more analyzers (e.g., first, second, and third analyzer 106, 108, and/or 110, respectively, arranged about the specimen testing apparatus 100). More or less numbers of analyzers can be used. The analyzers may be any combination of clinical chemistry analyzers and/or assaying instruments, or the like. The specimen containers 102 may be any suitably transparent or translucent container, such as a blood collection tube, test tube, sample cup, cuvette, or other clear or opaque glass or plastic container capable of containing and allowing imaging of the specimen 212. The specimen containers 102 may be varied in size.

Specimens 212 (FIGS. 2A-3E) may be provided to the specimen testing apparatus 100 in the specimen containers 102, which may be capped with a cap 214. The caps 214 may have different shapes and/or colors (e.g., red, royal blue, light blue, green, grey, tan, yellow, or color combinations), which may have meaning in terms of what test the specimen container 102 is used for, the type of additive included therein, whether the container includes a gel separator, and the like.

Each of the specimen containers 102 may be provided with a label 218 which may include identification information 218*i* (i.e., indicia) thereon, such as a barcode, alphabetic, numeric, or combination thereof. The identification information 218*i* may be machine readable at various locations about the specimen testing apparatus 100. The machine readable information may be darker (e.g., may be black) than the label material (e.g., white material) so that it can be readily imaged. The identification information 218*i* may indicate, or may otherwise be correlated, via a Laboratory Information System (LIS) 147, to a patient's identification as well as tests to be accomplished on the specimen 212, or other information, for example. Such identification information 218*i* may be provided on the label 218, which may be adhered to, or otherwise provided on, an outside surface of the tube 215. In the depicted embodiment of FIG. 2A, the label 218 may not extend all the way around the specimen container 102, or all along a length of the specimen container 102 and from the particular viewpoint shown, a large part (window) of the serum or plasma portion 212SP is viewable (part shown dotted in FIG. 2A) and is unobstructed (not occluded) by the label 218.

Figure 3B:
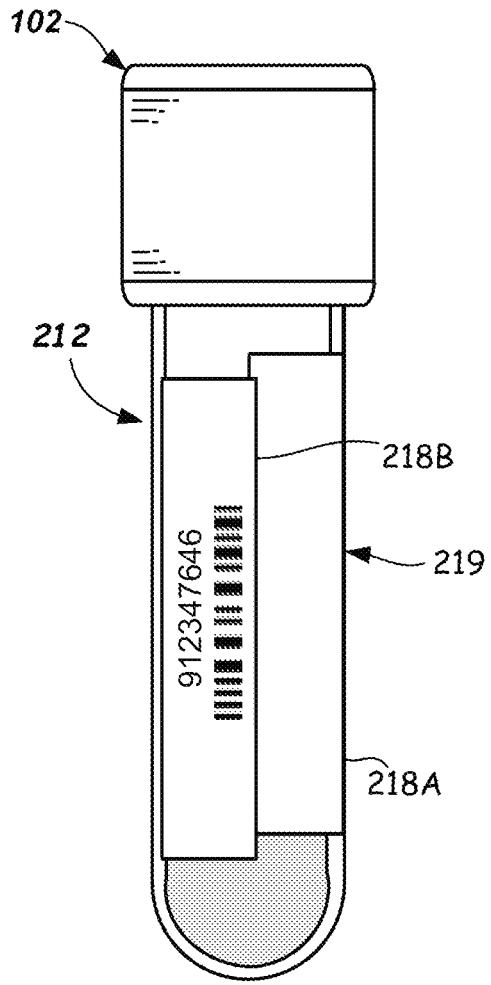
FIG. 3B illustrates a side view of a specimen container including a barcode label partially overlapping a manufacturer's label.
Figure 3C:
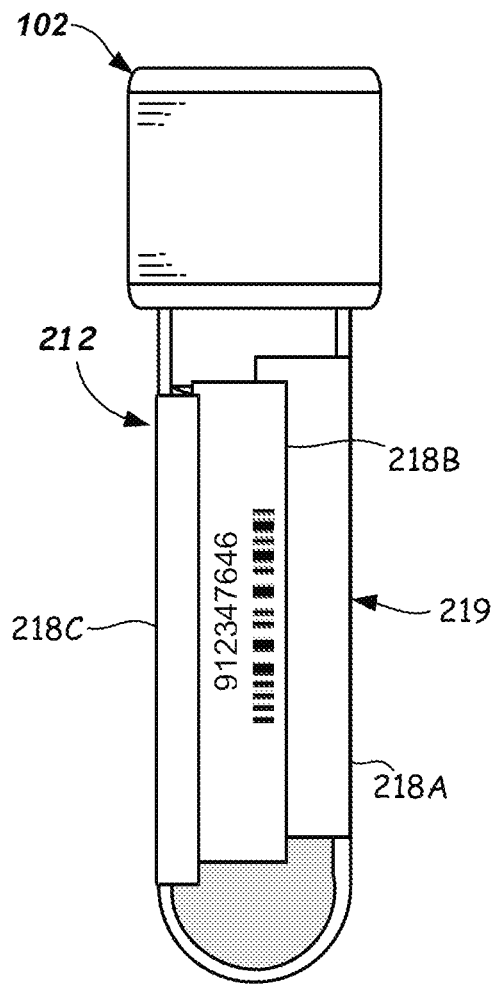
FIG. 3C illustrates a side view of a specimen container including barcode labels and a manufacturer's label.
Figure 3D:
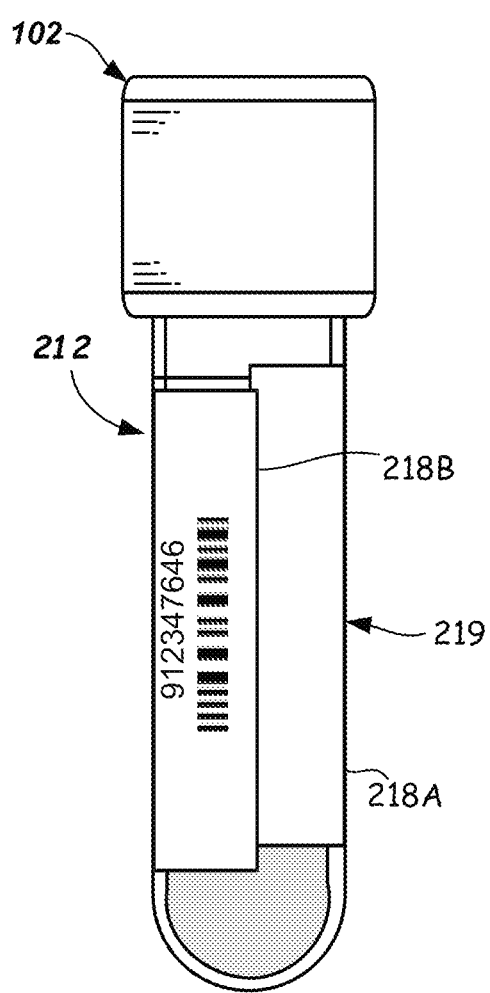
FIGS. 3D and 3E illustrate front and back side views of a specimen container including a manufacturer's label and multiple barcode labels wherein all lateral viewpoints are fully occluded by label (no serum or plasma portion is viewable with the naked eye).
Figure 3E:
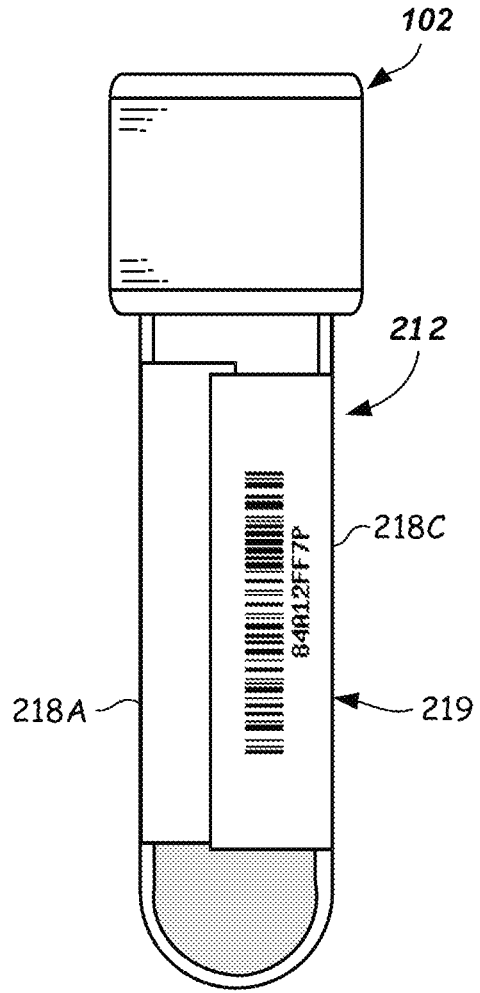

However, in some embodiments, such as is shown in FIGS. 3B and 3C, multiple labels 218A, 218B, and/or 218C may have been provided (such as from multiple facilities that have handled the specimen container 102), and they may overlap each other to some extent. In the embodiment shown in FIG. 3B, two labels (e.g., a manufacturer's label 218A and a barcode label 218B) are shown as overlapping and occluding at least one viewpoint. In FIG. 3C, 3 or more labels (e.g., manufacturer's label 218A, first barcode label 218B, and second barcode label 218C) may be provided on top of one another or overlapping one another, such as shown. Thus, in some instances, multiple labels may occlude more than one viewpoint of the serum or plasma portion 212SP such as two or more, or even all of the lateral viewpoints (i.e., so as to be totally occluded).

Figure 2A:
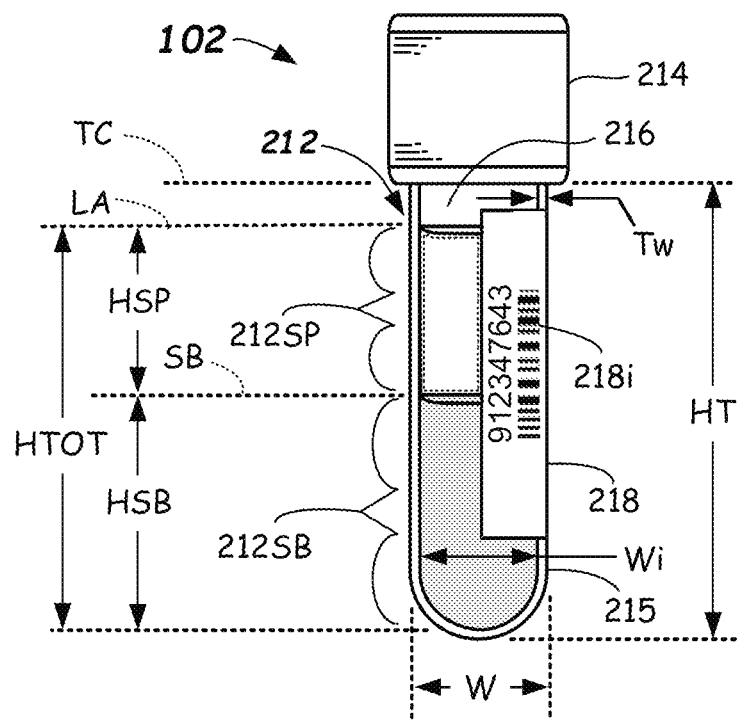
FIG. 2A illustrates a side (lateral) view of a specimen container including a separated specimen with a serum or plasma portion containing an interferent, and wherein the specimen container includes a barcode label thereon.

Thus, it should be understood that in some embodiments, although the label(s) 218 may occlude some portion of the specimen 212, some portion of the specimen 212 and serum and plasma portion 212SP may still be viewable from at least one viewpoint (See FIGS. 2A-2B, and 3A). In other embodiments, however, the labels 218A, 218B, and/or 218C may extend more fully around or even entirely around the girth of the specimen container 102, so as to partially or even fully occlude two viewpoints, or even fully or partially occlude all views of the serum or plasma portion 212SP of the specimen 212.

In any case, and in accordance with another broad aspect of the disclosure, embodiments of the characterization method can classify the segmentation data on the identified label-containing region with a convolutional neural network, and output from the convolutional neural network may be characterization of the label-containing region as being one or more of a group of pre-defined label configurations. The group of pre-defined label configurations may include: containing 1 label, containing 2 labels, containing 3 labels, containing a manufacturer's label, containing a barcode label, containing a manufacturer's label and a barcode label, and even more. This ability to identify and characterize a particular label configuration for a specimen container containing a specimen to be tested may be used in the specimen testing system 100 for a number of reasons, such as discussed above. For example, in some instances, if the label-containing region is extensive (fully or nearly fully occluding all views), then the specimen container may be offloaded for transfer to another container and also relabeled.

Again referring to FIG. 2A, the specimen 212 may include the serum or plasma portion 212SP and a settled blood portion 212SB contained within the tube 215. Air 216 may be provided above the serum and plasma portion 212SP and a line of demarcation between them is defined as the liquid-air interface (LA). The line of demarcation between the serum or plasma portion 212SP and the settled blood portion 212SB is defined as a serum-blood interface (SB). The interface between the air 216 and cap 214 is defined as a tube-cap interface (TC). The height of the tube (HT) is defined as a height from a bottom-most part of the tube 215 to a bottom of the cap 214, and may be used for determining tube size. The height of the serum or plasma portion 212SP is (HSP) and is defined as a height from a top of the serum or plasma portion 212SP from a top of the settled blood portion 212SB, i.e., from LA to SB. The height of the settled blood portion 212SB is (HSB) and is defined as a height from a bottom of the settled blood portion 212SB to a top of the settled blood portion 212SB at SB. HTOT is the total height of the specimen 212 and equals HSP plus HSB.

In cases where a gel separator 313 is used (FIGS. 2B and 3A), the height of the serum or plasma portion 212SP is (HSP) and is defined as a height from a top of the serum or plasma portion 212SP at LA to a top of the gel separator 313 at SG, i.e., from LA to SG, wherein SG is an interface between the serum or plasma portion 212SP and the gel separator 313. The height of the settled blood portion 212SB is (HSB) and is defined as a height from a bottom of the settled blood portion 212SB to a bottom of the gel separator 313 at BG, wherein BG is an interface between the settled blood portion 212SB and the gel separator 313. HTOT is the total height of the specimen 212 and equals HSP plus HSB plus height of the gel separator 313. In each case, Tw is a wall thickness, W is the outer width, which may also be used for determining the size of the specimen container 102, and Wi is the inner width of the specimen container 102.

In more detail, specimen testing apparatus 100 may include a base 120 (e.g., a frame, floor, or other structure) upon which a track 121 may be mounted. The track 121 may be a railed track (e.g., a mono rail or a multiple rail), a collection of conveyor belts, conveyor chains, moveable platforms, or any other suitable type of conveyance mechanism. Track 121 may be circular or any other suitable shape and may be a closed track (e.g., endless track) in some embodiments. Track 121 may, in operation, transport individual ones of the specimen containers 102 to various locations spaced about the track 121 in carriers 122.

Carriers 122 may be passive, non-motored pucks that may be configured to carry a specimen container 102 on the track 121, or optionally, an automated carrier including an onboard drive motor, such as a linear motor that is programmed to move about the track 121 and stop at pre-programmed locations. Other configurations of carrier 122 may be used. Carriers 122 may each include a holder 122H (FIG. 3A) configured to hold the specimen container 102 in a defined, upright position and orientation. The holder 122H may include a plurality of fingers or leaf springs that secure the specimen container 102 on the carrier 122, but some or all may be moveable or flexible to accommodate different sizes of the specimen containers 102. In some embodiments, carriers 122 may leave from the loading area 105 after being offloaded from the one or more racks 104. In some embodiments, loading area 105 may serve a dual function of also allowing reloading of the specimen containers 102 from the carriers 122 after pre-screening and/or analysis is completed.

A robot 124 may be provided at the loading area 105 and may be configured to grasp the specimen containers 102 from the one or more racks 104 and load the specimen containers 102 onto the carriers 122, such as on an input lane of the track 121. Robot 124 may also be configured to reload specimen containers 102 from the carriers 122 to the one or more racks 104 upon completion of analysis on in the case where a specimen transfer is flagged because of excessive labeling. The robot 124 may include one or more (e.g., least two) robot arms or components capable of X (lateral) and Z (vertical—out of the paper, as shown), Y and Z, X, Y, and Z, or r (radial) and theta (rotational) motion. Robot 124 may be a gantry robot, an articulated robot, an R-theta robot, or other suitable robot wherein the robot 124 may be equipped with robotic gripper fingers oriented, sized, and configured to pick up and place the specimen containers 102.

Upon being loaded onto track 121, the specimen containers 102 carried by carriers 122 may progress to a first pre-processing station 125. For example, the first pre-processing station 125 may be an automated centrifuge configured to carry out fractionation of the specimen 212. Carriers 122 carrying specimen containers 102 may be diverted to the first pre-processing station 125 by inflow lane or other suitable robot. After being centrifuged, the specimen containers 102 may exit on outflow lane, or otherwise be removed by a robot, and continue along the track 121. In the depicted embodiment, the specimen container 102 in carrier 122 may next be transported to a quality check module 130 to be further described herein with reference to FIGS. 4A and 4B.

The quality check module 130 is configured to pre-screen and carry out the characterization methods described herein, and may be configured for automatically determining a presence and possibly an extent of H, I, and/or L contained in a specimen 212 or whether N. If found to contain effectively-low amounts of H, I, and/or L, so as to be considered normal (N), the specimen 212 may continue on the track 121 and then may be analyzed by the one or more analyzers (e.g., first, second and third analyzers 106, 108, and/or 110). Thereafter, the specimen container 102 may be returned to the loading area 105 for reloading to the one or more racks 104 and the results may be provided to the LIS 147.

In some embodiments, in addition to HILN detection, quantification of the specimen 212 may take place at the quality check module 130 (i.e., determination of HSP, HSB, HTOT, and determination of location of SB or SG, and LA). In some embodiments, characterization of the physical attributes (e.g., size) of the specimen container 102 may take place at the quality check module 130. Such characterization may include determining HT and W, and possibly TC, and/or Wi. From this characterization, the size of the specimen container 102 may be extracted. Moreover, the quality check module 130 may also determine cap color and/or cap type, which may be used as a safety check to ensure that the proper specimen container 102 was used for the tests ordered through the LIS 147.

In some embodiments, a remote station 132 may be provided on the specimen testing apparatus 100 that is not directly linked to the track 121. For instance, an independent robot 133 (shown dotted) may carry specimen containers 102 to the remote station 132 and return them after testing/pre-processing. Optionally, the specimen containers 102 may be manually removed and returned. Remote station 132 may be used to test for certain constituents, such as a hemolysis level, or may be used for further processing, such as to lower a lipemia level through one or more additions and/or through additional processing, or to remove a clot, bubble or foam, for example. Other testing or processing may include pre-screening using the characterization method and/or HILN detection methods described herein at remote station 132.

Other stations may be provided at one or more locations on or along the track 121. The additional stations may include a de-capping station, aliquoting station, one or more additional quality check modules 130, and the like.

The specimen testing apparatus 100 may include a number of sensors 116 at one or more locations around the track 121. Sensors 116 may be used to detect a location of specimen containers 102 along the track 121 by means of reading the identification information 218i placed on the specimen container 102, or like information (not shown) provided on each carrier 122. Any suitable means for tracking the location may be used, such as proximity sensors. All of the sensors 116 may interface with the computer 143, so that the location of each specimen container 102 may be appropriately known at all times.

The pre-processing stations and the one or more analyzers 106, 108, 110 may be equipped with robotic mechanisms and/or inflow lanes configured to remove carriers 122 from the track 121, and robotic mechanisms and/or outflow lanes configured to reenter carriers 122 to the track 121.

Specimen testing apparatus 100 may be controlled by a computer 143, which may be a microprocessor-based central processing unit CPU or GPU, having a suitable processing capability and memory and suitable conditioning electronics and drivers for operating the various system components. Computer 143 may be housed as part of, or separate from, the base 120 of the specimen testing apparatus 100. The computer 143 may operate to control movement of the carriers 122 to and from the loading area 105, motion about the track 121, motion to and from the first pre-processing station 125 as well as operation of the first pre-processing station 125 (e.g., centrifuge), motion to and from the quality check module 130 as well as operation of the quality check module 130, and motion to and from each analyzer 106, 108, 110 as well as operation of each analyzer 106, 108, 110 for carrying out the various types of testing (e.g., assay or clinical chemistry).

For all but the quality check module 130, the computer 143 may control the specimen testing apparatus 100 according to software, firmware, and/or hardware commands or circuits such as those used on the Dimension® clinical chemistry analyzer sold by Siemens Healthcare Diagnostics Inc. of Tarrytown, N.Y., and such control is typical to those skilled in the art of computer-based electromechanical control programming and will not be further described herein. However, other suitable systems for controlling the specimen testing apparatus 100 may be used. The control of the quality check module 130 may also be provided by the computer 143, but according to the inventive characterization methods and HILN methods, as described in detail herein.

The computer 143 used for image processing to carry out for the characterization methods and HILN methods described herein may include a CPU, GPU or combinations thereof having sufficient processing capability, suitable RAM, and suitable storage. In one example, the computer 143 may be a multi-processor-equipped personal computer (PC) with one or more GPUs, 8 GB Ram or more, and a Terabyte or more of storage. In another example, the computer 143 may be a GPU-equipped PC, or optionally a CPU-equipped PC, operated in a parallelized mode and including 8 GB RAM or more, and suitable storage. In some embodiments, multiple computers may be used, one relatively stronger one for the training of the CNN and one for carrying out testing and the characterization methods and HILN detection as described herein. Suitable processors may include INTEL® XEON® Processor, INTEL® CORE™ processor family and INTEL® ATOM™ processor family or even low-energy TEGRA® system on chip (S-OC) including ARM® CORTEX® A9 r4 CPU available from NVIDIA®. Other suitable processors may be used. Operating systems based on Windows, Linux, and OS X may be used.

Embodiments of the disclosure may be implemented using a computer interface module (CIM) 145 that allows for a user to easily and quickly access a variety of control and status display screens. These control and status display screens may display and enable control of some or all aspects of a plurality of interrelated automated devices used for preparation and analysis of specimens 212. The CIM 145 may employed to provide information about the operational status of a plurality of interrelated automated devices as well as information describing the location of any specimen 212 as well as a status of tests to be performed on, or being performed on, the specimen 212. The CIM 145 is thus adapted to facilitate interactions between an operator and the specimen testing apparatus 100. The CIM 145 may include a display screen adapted to display a menu including icons, scroll bars, boxes, and buttons through which the operator may interface with the specimen testing apparatus 100. The menu may comprise a number of function elements programmed to display and/or operate functional aspects of the specimen testing apparatus 100.

Figure 4A:
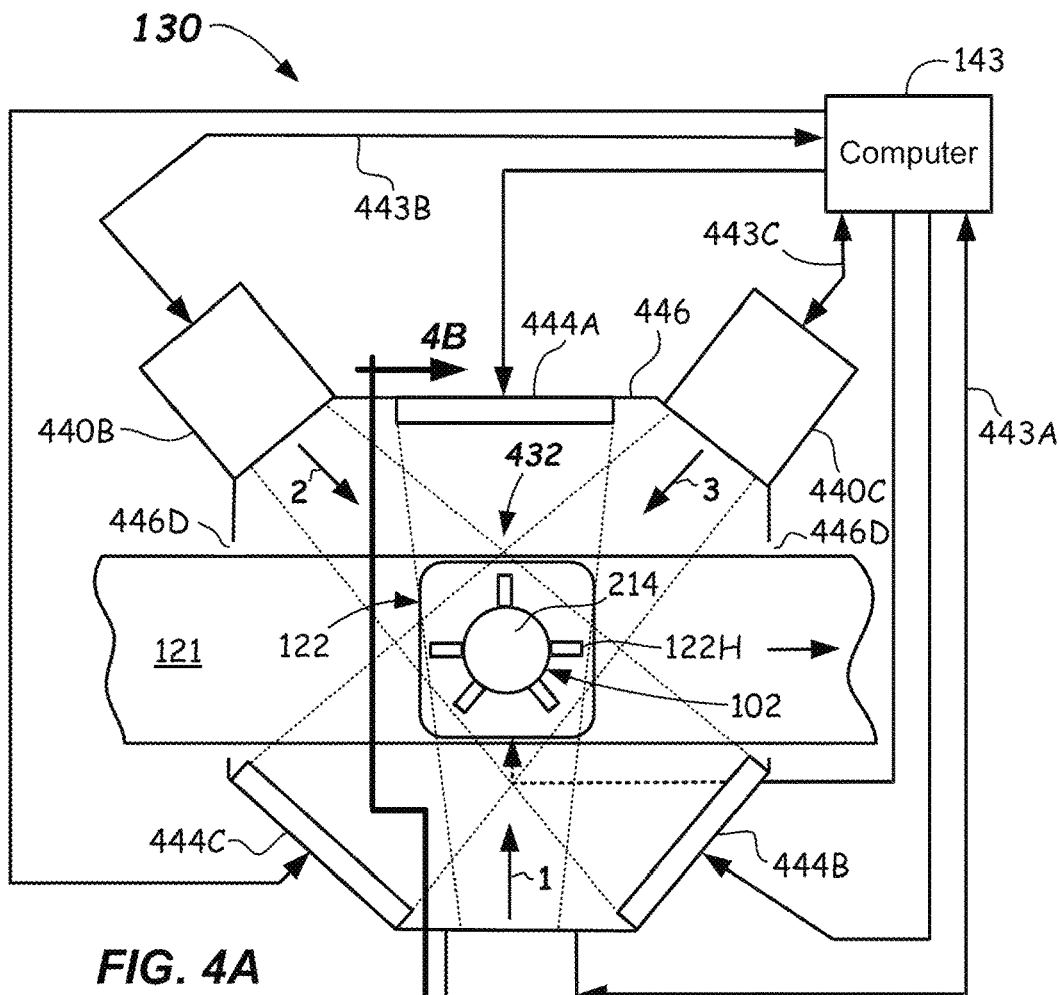
FIG. 4A illustrates a schematic top view of a quality check module (with ceiling removed) including multiple viewpoints and configured to capture and analyze multiple backlit images to enable label characterization and optionally determining a presence of an interferent according to one or more embodiments.
Figure 4B:
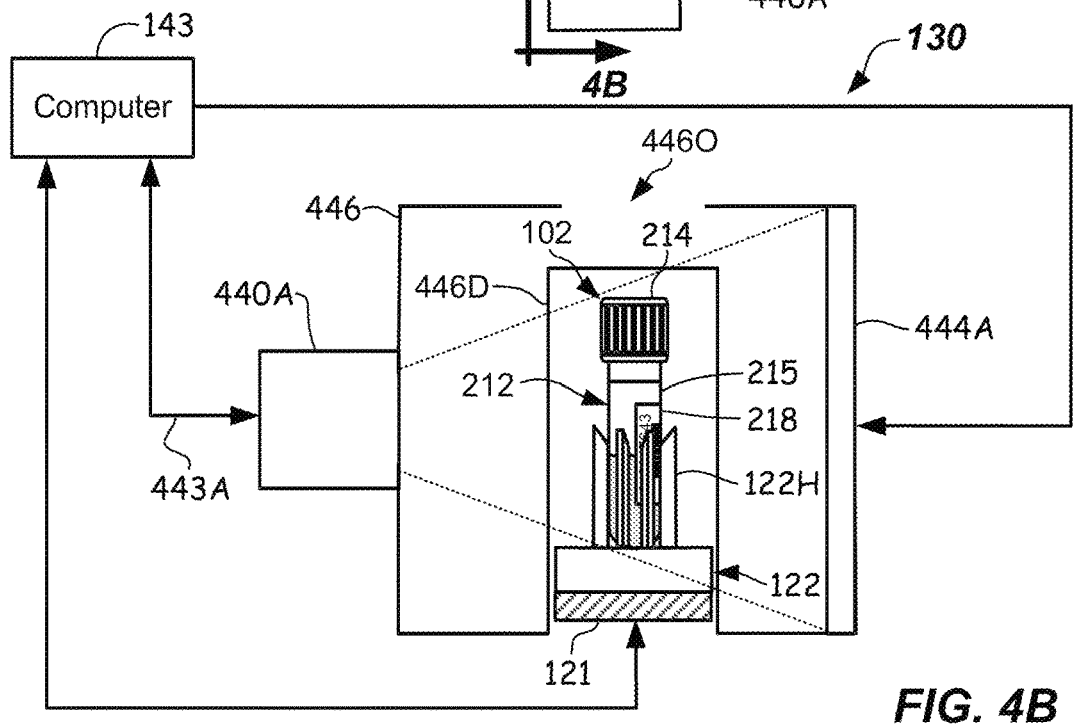
FIG. 4B illustrates a schematic side view of the quality check module (with front enclosure wall removed) of FIG. 4A according to one or more embodiments.
Figure 5A:
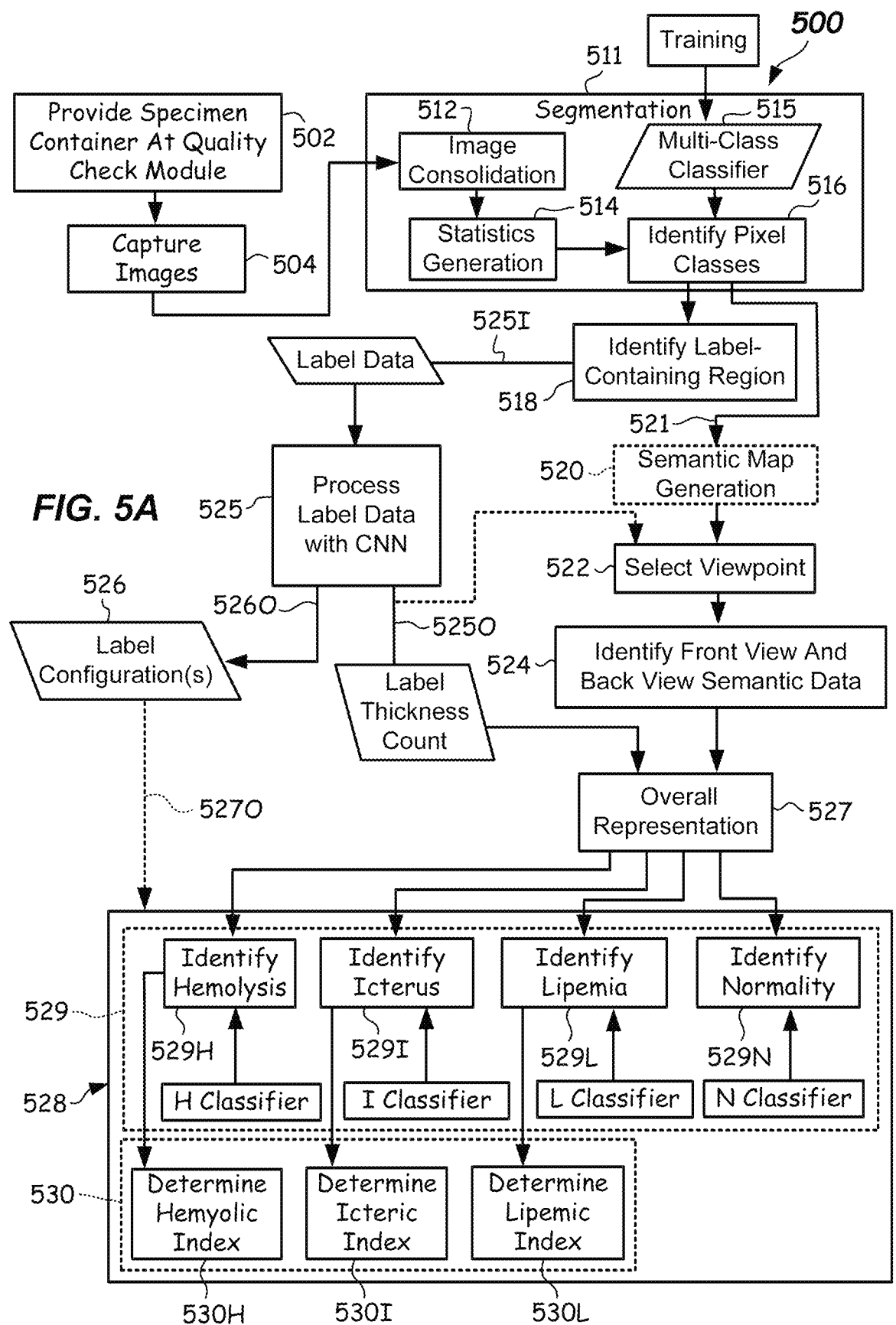
FIG. 5A illustrates a block diagram of functional components of a quality check module configured to characterize a label-containing region and optionally determine a presence of H, I, and/or L or N in a specimen according to one or more embodiments.

Now referring to FIGS. 4A-4B and 5A, a first embodiment of a quality check module 130 is shown and described. Quality check module 130 may be configured and adapted to carry out the characterization method, and may also be used to automatically pre-screen for a presence of an interferent (e.g., H, I, and/or L) in a specimen 212 (e.g., in a serum or plasma portion 212SP thereof) prior to analysis by the one or more analyzers 106, 108, 110. In addition to the characterization methods and interferent detection methods described herein, other detection methods may take place on the specimen 212 contained in the specimen container 102 provided at the quality check module 130 in 502 (FIG. 5A). For example, a method may be carried out at the quality check module 130 to quantify the specimen 212, i.e., determine certain physical dimensional characteristics of the specimen 212 (e.g., LA and SB, and/or determination of HSP, HSB, and/or HTOT). Quantification may involve estimating a volume of the serum or plasma portion (VSP) and/or a volume of the settled blood portion (VSB), for example. Other quantifiable geometrical features may also be determined. Furthermore, the quality check module 130 may be used to quantify geometry of the specimen container 102, i.e., quantify certain physical dimensional characteristics of the specimen container 102, such as the location of TC, HT, and/or W or Wi of the specimen container 102.

Now referring to FIGS. 1, 4A, and 4B, and 5A, a first embodiment of a quality check module 130 may include multiple image capture devices 440A-440C. Three image capture devices 440A-440C are shown and are preferred, but two or more or four or more can be used. Image capture devices 440A-440C may be any suitable device for capturing well-defined digital images, such as conventional digital cameras capable of capturing a pixelated image, charged coupled devices (CCD), an array of photodetectors, one or more CMOS sensors, or the like. For example, the three image capture devices 440A, 440B, 440C are illustrated in FIG. 4A and are configured to capture images (capture images 504) from three different lateral viewpoints (labeled 1, 2, and 3). For example, in some embodiments, the image size may be about 2560×694 pixels, for example. In another embodiment, the image capture devices 440A, 440B, 440C may capture an image size that may be about 1280×387 pixels, for example. Other image sizes and pixel densities may be used.

Each of the image capture devices 440A, 440B, and 440C may be configured and operable to capture lateral images of at least a portion of the specimen container 102, and at least a portion of the specimen 212. For example, the image capture devices 440A-440C may capture a part of the label 218 and part or all of the serum or plasma portion 212SP from each viewpoint 1-3. For example, in some instances, part of a viewpoint 1-3 may be partially occluded by label 218. In some embodiments, one or more of the viewpoints 1-3 may be fully occluded, i.e., no clear view of the serum or plasma portion 212SP is possible from the one or more viewpoints 1-3. However, even in cases where a side (front side or back side) of a viewpoint 1-3 is fully occluded by one or more labels 218, the characterization method may still be able to distinguish the boundaries of the serum or plasma portion 212SP through the one or more occluding labels, depending on the number of layer thicknesses present. For example, above 3 layer thicknesses, it becomes very difficult to distinguish the serum or plasma portion 212SP. Thus, being able to accurately assess the layer thicknesses present from various viewpoints 1-3 can help determine if the serum or plasma portion 212 can be classified for HILN with a high degree of confidence.

The image capture devices 440A-440C may also capture some or all of the cap 214 and some or all of the tube 215. Eventually, from the multiple images and segmentation results, a composite model of the specimen 212 in the specimen container 102 can be optionally developed. The composite model may be a 3D semantic model in some embodiments, and may be used to aid in making final determinations about the specimen 212. It should be apparent that a semantic model is optional, and that the characterization method may take place using only the image data obtained from the one or more viewpoints 1-3.

In the embodiment shown, the plurality of image capture devices 440A, 440B, 440C are arranged around the specimen 212 and configured to capture lateral images of the specimen container 102 and specimen 212 at an imaging location 432 from the multiple viewpoints 1-3. The viewpoints 1-3 may be spaced so that they are approximately equally spaced, such as about 120 degrees from one another, as shown, when three image capture devices 440A, 440B, 440C are used. As depicted, the image capture devices 440A, 440B, 440C may be arranged around the track 121. Other arrangements of the plurality of image capture devices 440A, 440B, and 440C may be used. In this way, the images of the specimen 212 in the specimen container 102 may be taken while the specimen container 102 is residing in the carrier 122. The field of view of the multiple images obtained by the image capture devices 440A, 440B, and 440C may overlap slightly in a circumferential extent so that no portion of the circumference is missed.

In one or more embodiments, the carriers 122 may be stopped at a pre-determined location, such as at the imaging location 432, i.e., at a point where normal vectors from each of the image capture devices 440A, 440B, and 440C intersect each other. A gate or the linear motor of the carrier 122 may be provided to stop the carriers 122 at the imaging location 432, so that multiple quality images may be captured thereat. In an embodiment where there is a gate at the quality check module 130, one or more sensors (like sensors 116) may be used to determine the presence of a carrier 122 at the quality check module 130.

The image capture devices 440A, 440B, 440C may be provided in close proximity to and trained or focused to capture an image window at the imaging location 432, wherein the image window is an area including an expected location of the specimen container 102. Thus, the specimen container 102 may be stopped so that it is provided approximately located in a center of the image window of the quality check module 130 in some embodiments. Within the images captured, one or more reference datum may be present. The reference datum may aid in quantification of the specimen 212. Reference datum may be TC or the bottommost portion of the tube 215, or a mark placed in a known location somewhere on the specimen container 102 that can be viewed from at least one or all viewpoints 1-3, for example.

In operation, each image may be triggered and captured responsive to a triggering signal provided in communication lines 443A, 443B, 443C sent by the computer 143. Each of the captured images may be processed by the computer 143 according to the characterization method provided herein. In one particularly effective method, high data rate (HDR) processing may be used to capture and process the image data.

In more detail, in accordance with one or more embodiments, multiple images are captured of the specimen 212 at the quality check module 130 at multiple different exposure times while also being illuminated at one or more different spectra. For example, each image capture device 440A, 440B, 440C may take 4-8 images of the specimen container 102 including the serum or plasma portion 212SP at different exposure times at each of the one or more spectra. Other numbers of images may be taken.

In one embodiment, the multiple spectral images may be accomplished using different light sources 444A-444C emitting different spectral illumination. The light sources 444A-444C may back light the specimen container 102 (as shown). A light diffuser may be used in conjunction with the light sources 444A-444C in some embodiments. The multiple different spectra light sources 444A-444C may be RGB light sources, such as LEDs emitting nominal wavelengths of 634 nm+/−35 nm (Red), 537 nm+/−35 nm (Green), and 455 nm+/−35 nm (Blue). In other embodiments, the light sources 444A-444C may emit one or more spectra having a nominal wavelength between about 700 nm and about 1200 nm. In other embodiments, the light sources 444A-444C may be white light sources. In cases where the label 218 obscures multiple viewpoints, IR backlighting or NIR backlighting may be used. In cases where multiple labels (See FIGS. 3D-3E) obscure the entire serum or plasma portion 212SP, the light sources 444A-444C may be IR or NIR light sources, as reasonable segmentation information may be generated on the serum or plasma portion 212SP even through the labels 218A-218C. Furthermore, RGB light sources may be used in some instances even when label occlusion is present, such as when a low number of label layers are present.

In the way of one non-limiting example, to capture images at a first wavelength, three red light sources (wavelength of about 634 nm+/−35 nm) may be used to illuminate the specimen 212 from three lateral locations. The red illumination by the light sources 444A-444C may occur as the multiple images (e.g., 4-8 images or more) at different exposure times are captured by each image capture device 440A-440C from each viewpoint 1-3. In some embodiments, the exposure times may be between about 0.1 ms and 256 ms. Other exposure times may be used. In some embodiments, each of the respective images for each image capture device 440A-440C may be taken sequentially, for example. Thus, for each viewpoint 1-3, a group of images are obtained that have red spectral backlit illumination and multiple (e.g., 4-8) exposures, such as different exposure times. The captured image data is stored in memory of the computer 143.

In each embodiment, the quality check module 130 may include a housing 446 that may at least partially surround or cover the track 121 to minimize outside lighting influences. The specimen container 102 may be located inside the housing 446 during the image-taking sequences. Housing 446 may include one or more doors 446D to allow the carriers 122 to enter into and/or exit from the housing 446. In some embodiments, the ceiling may include an opening 446O to allow a specimen container 102 to be loaded into the carrier 122 by a robot including moveable robot fingers from above.

Once the red illuminated images are captured, another spectra of light, for example, green spectral light sources 444A-444C may be turned on (nominal wavelength of about 537 nm with a bandwidth of about +/−35 nm), and multiple images (e.g., 4-8 or more images) at different exposure times may be sequentially captured by each image capture device 440A, 440B, 440C. This may be repeated with blue spectral light sources 444A-444C (nominal wavelength of about 455 nm with a bandwidth of about +/−35 nm) for each image capture devices 440A, 440B, 440C. If desired, other suitable spectral illuminations may be used, either optionally or alternatively. The different nominal wavelength spectral light sources 444A-444C may be accomplished by light panels including banks of different spectral light sources (e.g., R, G, B, W, IR, and/or NIR) that can be selectively turned on and off, for example. Other means for backlighting may be used.

The multiple images taken at multiple exposure times for each respective wavelength spectrum may be obtained in rapid succession, such that the entire collection of images for the specimen container 102 and specimen 212 from multiple viewpoints 1-3 may be obtained in less than a few seconds, for example. In one example, 4 different exposure images for each spectrum at three viewpoints using the image capture devices 440A, 440B, 440C and back lighting with RGB light sources 444A-444C will result in 4 images×3 spectra×3 viewpoints=36 images. In another example, 4 different exposure images for each wavelength spectrum at three viewpoints using the image capture devices 440A, 440B, 440C and back lighting with light sources 444A-444C (e.g., R, G, B, W, IR, and NIR) will result in 4 images×6 spectra×3 viewpoints=72 images.

Further, as part of a training process, multiple reference images may be taken on labeled specimen containers 102 without any specimen 212 contained therein. The reference images may number in the thousands and may constitute examples of many possible label configurations and label thickness counts for labels provided on the specimen container 102. As will be apparent from the following, the CNN 535 may be trained using the multiple reference images. The training involves populating the reference database with a sufficient number of images for each of the pre-defined label classifications that can be an output from the CNN 535. More details of the training method are provided below.

According to embodiments of the characterization methods, the processing of the image data may involve, for example, selection of optimally-exposed pixels from the multiple captured images at the different exposure times at each spectrum and for each image capture device 440A-440C, so as to generate optimally-exposed image data set for each spectrum and for each viewpoint 1-3. This data reduction is referred to as "image consolidation" herein.

For each corresponding pixel (or patch), for each of the images from each image capture device 440A-440C, pixels (or patches) exhibiting optimal image intensity may be selected from each of the different exposure time images for each viewpoint 1-3. In one embodiment, optimal image intensity may be pixels (or patches) that fall within a predetermined range of intensities (e.g., between 180-254 on a scale of 0-255), for example. In another embodiment, optimal image intensity may be between 16-254 on a scale of 0-255), for example. If more than one pixel (or patch) in the corresponding locations of two images is determined to be optimally exposed, the higher of the two is selected. The selected pixels (or patches) exhibiting optimal image intensity may be normalized by their respective exposure times. The result is a plurality of normalized and consolidated spectral image data sets for the illumination spectra (e.g., R, G, B, white light, IR, and/or IR—depending on the combination used) for each image capture device 440A-440C where all of the pixels (or patches) are optimally exposed (e.g., one image data set per spectrum). In other words, for each viewpoint 1-3, the data processing carried out by the computer 143 results in a plurality of optimally-exposed image data sets, one for each illumination spectra employed.

Now referring to FIG. 5A, for each image data set including optimally-exposed pixels (or patches), a characterization process referred to herein as segmentation 511 is undertaken to identify the pixels (or patches) in the optimally-exposed image data sets that are classified as serum or plasma portion 212SP. Additionally, the segmentation 511 classifies the pixels (or patches) that are label 218. Classification of the serum or plasma portion 212SP and the labels 218 constituting a label-containing region 219 may be based upon operation of a multi-class classifier 515 generated from multiple training sets.

According to embodiments, to carry out the classification, statistical data may be computed and generated in 514 for each of the optimally-exposed pixels (or patches) at the different spectra (e.g., R, G, B, W, IR, and/or NIR) used for each image capture device 440A-440C. The statistics generation 514 may include mean values and covariance up to $2^{nd}$ order, for example. The calculated statistical attributes encode specific properties of object classes and are thus used for discrimination between the different object classes by assigning class labels. Once generated, the statistical data is presented to, and operated on, by the multi-class classifier 515, which identifies pixel classes in 516. In particular, the multi-class classifier 515 may classify the pixels (or superpixels/image patches) as belonging to one of a plurality of classes, such as 1-serum or plasma portion, 2-settled blood portion, 3-tube, 4-air, 5-cap, 6-label, 7-holder, and/or 8-gel separator (if used).

From this, the pixels (or patches) making up the serum and plasma portion 212SP and the label-containing region 219 including labels 218, 218A and 218B, or 218A-218C may be identified at pre-screening (depending on the label configuration) by the quality check module 130. The label containing region 219 is an area extending across one or more viewpoints (e.g., viewpoints 1-3) identified as including a label 218 (e.g., FIG. 2B), or dual labels 218A, 218B (FEG. 3B), or triple labels 218A, 218B, and 218C (FIG. 3C), for example.

The multi-class classifier 515 may be any suitable type of supervised classification model that is linear or non-linear. For example, the multi-class classifier 515 may be a support vector machine (SVM) that is either linear or kernel-based. Optionally, the multi-class classifier 515 may be a boosting classifier such as an adaptive boosting classifier (e.g., AdaBoost, LogitBoost, or the like), any artificial neural network such as a CNN, a tree-based classifier (e.g., decision tree, random decision forests), and logistic regression as a classifier, or the like. Other suitable programs or toolboxes may be used for segmentation by classifying the extent of the serum or plasma portion 212SP and the label-containing region 219. A SVM may be particularly effective for classification between liquids and non-liquids, such as found in the analysis of the specimen 212 including settled blood portion 212SB (semi-solid portion) and serum or plasma portion 212SP (liquid portion). A SVM is a supervised learning model with associated learning algorithms that analyzes data and recognizes patterns.

Multiple sets of training examples are used to train the multi-class classifier 515. The multi-class classifier 515 may be trained by graphically outlining various regions to be classified of a multitude of examples of specimen containers 102 having various specimen conditions, various degrees of occlusion by label 218, 218A, 218B, or 218A-218C, label counts, occlusion by holder 122H, levels of serum or plasma portion 212SP and settled blood portions 212SB, and the like. As many as 500 or more, or even 5,000 or more images may be used for training the multi-class classifier 515. Training in each class sought as an output from the multi-class classifier 515 is undertaken.

Training builds the multi-class classifier 515 that assigns pixels (or patches) of any new specimen 212 in specimen containers 102 that are tested. In particular, the SVM represents examples as points in space that are mapped so that the examples of the separate classes are divided by a clear gap that is as wide as possible. New pixels from the image data sets may be mapped into that same space and predicted to belong to a particular class based on which side of the gap they fall on. In some embodiments, SVMs can efficiently perform a non-linear classification using what is called a kernel trick (e.g., kernel-based SVM classifier), implicitly mapping their inputs into high-dimensional feature spaces.

Figure 5B:
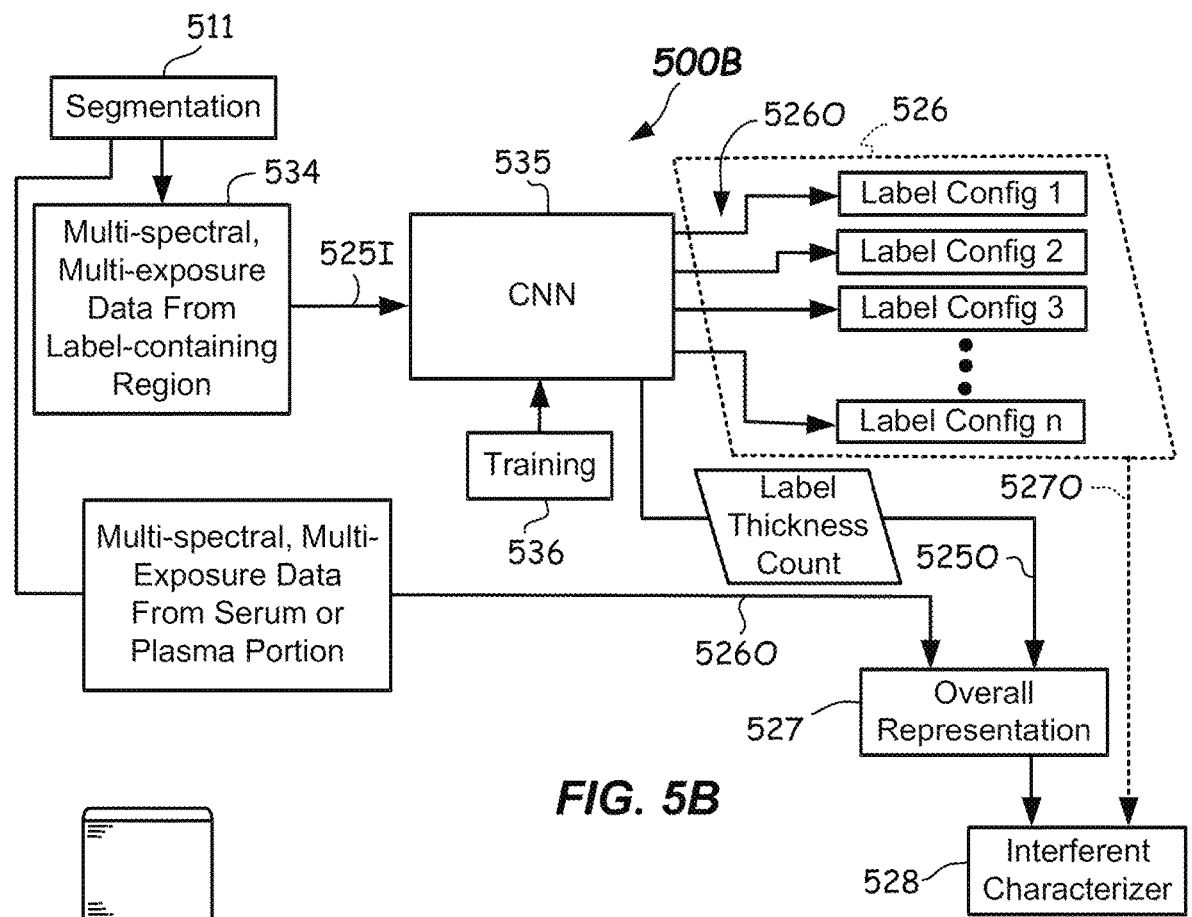
FIG. 5B illustrates a simplified block diagram of functional components of a quality check module configured to carry out characterization of a label-containing region and optionally determine a presence of H, I, and/or L or N in a specimen according to one or more embodiments.

Referring to FIGS. 5A-5B, from the pixel (or patch) identification of pixel classes in 516, the label-containing region 219 may be identified in 518. The label-containing region 219 may be identified (e.g., filtered) by any suitable binary mask, for example, where only pixels (or patches) that are classified as being label are sent to input line 525I for processing with the CNN 535 (FIG. 5B) in 525. The multi-spectral, multi-exposure consolidated image data sets associated with the label-containing region 219 in 525I are provided as input into the CNN 535 and the data sets are operated upon and processed by the CNN 535 in 525. In data line 521, the consolidated image data including pixel class information is provided to optional semantic map generation 520. This data stream in data line 521 includes both serum or plasma data as well as label data and may include other data as well.

The output of the processing of the label data with the CNN in 525 may be 1) one or more of: per pixel data (or per patch data) on label thickness count in output line 525O, and/or 2) characterization of the label-containing region 219 as being one or more pre-defined label configurations 526 in $2^{nd}$ output line 526O.

For example, in output line 525O, the output may be a label thickness count, wherein the label thickness count is generated on a per pixel basis (or per patch basis) as one possible output from the CNN 535. Thus, for each pixel (or patch), an outputted label thickness count may be provided for layer coding for each pixel (or patch), and may number 1 layer, 2 layers, 3 layers, or more layers, for example.

Figure 5C:
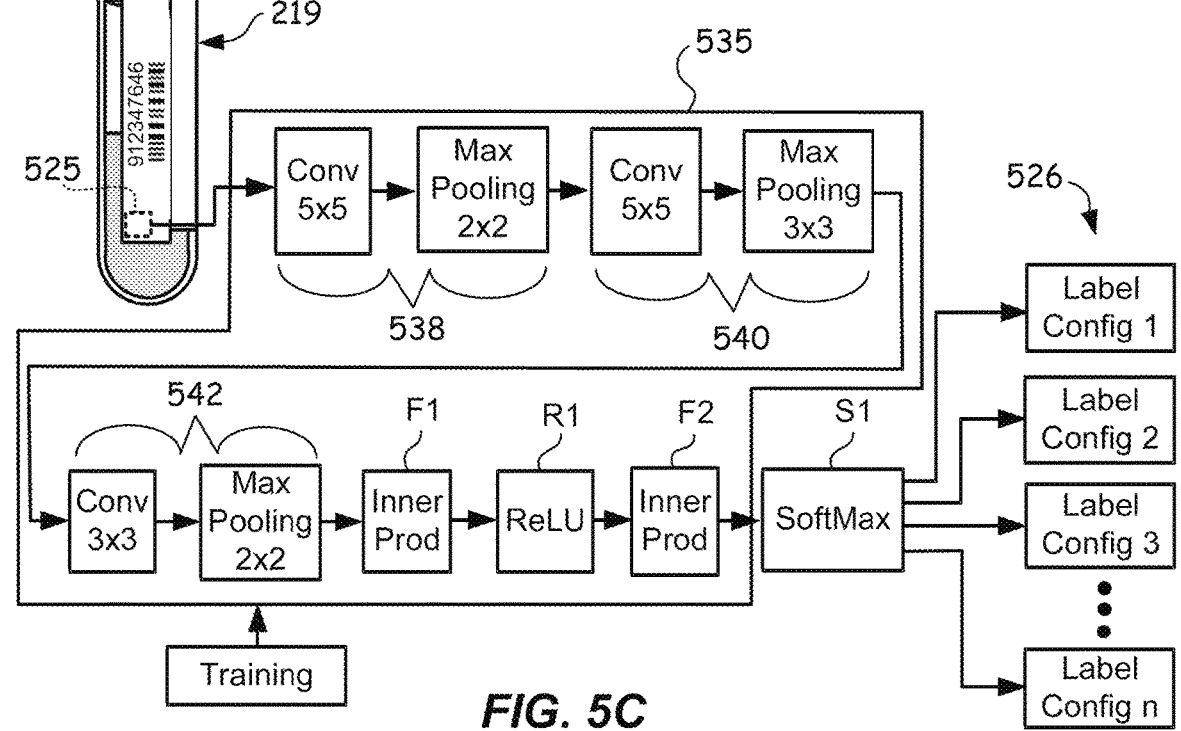
FIG. 5C illustrates a block diagram of a training architecture of an example embodiment of a convolutional neural network (CNN) configured to carry out characterization of a label-containing region according to one or more embodiments.
Figure 5D:
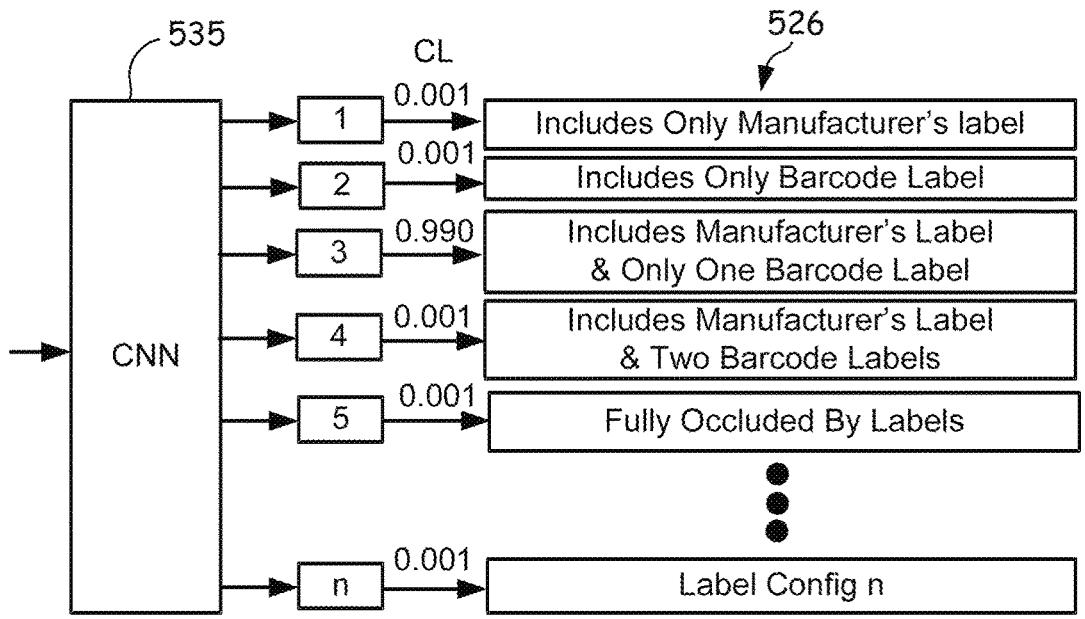
FIG. 5D illustrates a block diagram of a single-output architecture of one embodiment of a CNN configured to carry out characterization of a label-containing region according to one or more embodiments.

In the $2^{nd}$ output line 526O, the output from the CNN 535 may be one or more of a number of pre-determined label configuration(s) 526. The pre-determined label configuration(s) 526, as is best shown in FIGS. 5B-5D, may include multiple possible label configurations (e.g., Label Config 1, 2, 3, . . . , n), that can be any of the possible label configurations that can be encountered in practice, that the CNN 535 was trained in 536 to recognize. For example, one configuration option of the pre-determined label configuration(s) 526 may be whether the specimen container 102 includes only a manufacturer's label. Another configuration option may be whether the specimen container includes a manufacturer's label. Another configuration option of the pre-determined label configuration(s) 526 may be whether the specimen container 102 includes only a barcode label. Another configuration option of the pre-determined label configuration(s) 526 may be whether the specimen container 102 includes a barcode label.

Other configuration options of the pre-determined label configuration(s) 526 may include, for example, either in addition to the above or in place of the above, one or more of:

determining there is a manufacturer's label and only one barcode label on the specimen container, determining there is a manufacturer's label and a barcode label on the specimen container, determining there is a manufacturer's label and two barcode labels on the specimen container, determining if the serum or plasma portion is fully occluded by labels, determining an overall label count on the specimen container (e.g., determining that an overall label count=1 label on the specimen container, determining that an overall label count=2 labels on the specimen container, and/or determining that an overall label count=3 labels on the specimen container), determining if one or more viewpoints are fully occluded by the labels (e.g., determining whether viewpoint 1 is fully occluded by labels, determining whether viewpoint 2 is fully occluded by labels, and/or determining whether viewpoint 3 is fully occluded by labels), determining there is one barcode label on the specimen container, and the one barcode label covers at least some of a manufacturer's label on the specimen container, determining there are two barcode labels on the specimen container, a covered barcode label and one that is a fully-visible barcode label, wherein the fully-visible barcode label covers at least some of the covered barcode label, and the covered barcode label covers at least some of a manufacturer's label on the specimen container, determining there are three barcode labels on the specimen container, a first covered barcode label, a second covered barcode label, and one that is a fully-visible barcode label, wherein the fully-visible barcode label covers at least some of the second covered barcode label, and the second covered barcode label covers at least some of the first covered barcode label, and the covered barcode label covers at least some of a manufacturer's label on the specimen container, and determining there is one visible barcode label on the specimen container, and that other labels together with the one visible barcode label fully occlude the serum or plasma portion around an entire circumference of the specimen container.

Up to about 20 label configuration options of the pre-determined label configurations, for example, may be included, while still providing suitably efficient processing. Other numbers of label options may be used providing sufficient processing capability and storage is available. Other different label configurations than those described above may be used.

Based upon the output of the CNN 535 for any particular specimen container 102 and specimen 212 being pre-screened, one or more further actions may be implemented. For example, if the overall label count is equal to or above a predefined threshold label count (for example ≥4 labels), then the specimen container 102 may be rejected. The specimen container 102 having too many labels may be offloaded from the quality control module 130 and may be transferred into another specimen container 102 and may be relabeled, for example.

Again referring to FIG. 5A, in some embodiments, the outputted result(s) of label configuration from 526 may be also provided as an input to an interferent characterizer 528. In particular, the second output line 5270 (shown dotted) may provide data that may be used to enable a better overall determination of the confidence in the results of the interferent characterizer 528.

As shown in FIG. 5B, the CNN 535 is trained by CNN training 536 by imaging with the quality control module 130, a multitude of samples of specimen containers 102 including different label configurations for each of the desired pre-defined label configurations 526 that are desired and which have been coded to be the solution options (e.g., label Config 1-n). The CNN training 536 may involve inputting images of specimen containers 102 including various label configurations, along with label characterization information.

Label characterization information may include an overall number of labels (overall label count), highest number of layer thicknesses present (label thickness count), identification (e.g., graphically outlining) boundaries of a label-containing region 219), identification of any region or sub-region that is a manufacturer's label, identification of any region(s) or sub-regions that is/are barcode label(s), number of barcode labels, identification of areas of overlap, identification of areas of single thickness (layer count=1 layer), double thickness—layer count=2 layers, and triple thickness (layer count=3 layers), whether certain viewpoints are fully occluded by label(s) whether the specimen container 102 is fully occluded by labels, and the like. Other label characterization information may be included as training input that is desired as a label configuration output.

Reference images may include specimen containers 102 of various sizes, including different label types (manufacturer's labels and barcode labels), and having a single label 218, two labels 218A, 218B, and three labels 218A-218C as previously described, and in various rotational orientations and label configurations (e.g., degrees of overlap and occlusion). Training may be accomplished on as many reference examples as needed to obtain a good degree of confidence in each result.

Once a starting number of sample labeled specimen containers have been imaged and stored, the CNN 535 may be tested intermittently with a test specimen container to see if the CNN 535 is operating at a sufficiently high level of confidence. If not operating at near 100% (e.g., >98%) confidence in determining the correct label configuration (e.g., Label Config 1-n) as an output, then more training samples may be imaged and input along with associated label characterization information. The CNN 535 may then be retested to determining if it is choosing the label configuration correctly. Training 536 may be stopped when suitable level of confidence in the result of the determined label configuration at 526 is obtained.

During training phase, small regions may be extracted that fulfil defined criteria. For example, the criteria may include only label-containing regions 219 with low variance such as white regions with no barcode elements and/or fonts, i.e., the indicia 218$i$ may be ignored.

The training may first utilize an erosion operation to the label-containing region 219 by a 16×16 element, for example. A sliding window 525 (e.g., size 64×64 pixels) with stride of 1 pixel is used to scan through the eroded label-containing region 219. If some resulting patch centers at a pixel that belongs to the eroded label-containing region, it will be considered. Various patches may be randomly sampled from the training image data sets and create the representation required for deep learning. The features are stored in a suitable database of the computer 143. The CNN 535 may be trained on a n-class patch classification task, where n is the number of pre-determined label configurations 526 (label Config 1-n).

One example architecture of the CNN 535 may be used for training is shown in FIG. 5C, and also described in Table 1 below. The CNN 535 may be coded using any suitable scientific computing framework, program, or toolbox, such as, Caffe available from Berkley Vision and Learning Center (BVLC), Theano, a Python framework for fast computation of mathematical expressions involving multi-dimensional arrays, TensorFlow available from Google, Inc., Torch, and the Math Kernel Library (MKL) available from Intel Corporation of Santa Clara, Calif., which is an optimized math library for CPU-based neural network computations, and the like, for example.

In more detail, the CNN 535 may include suitable number of operating layers to provide for deep learning. The described training architecture may be used for classification using a 64×64 patch (64 pixels×64 pixels), for example. However, other patch sizes may be used, such as 31 pixels× 31 pixels. For the label counting task, three major operating layers of the CNN 535 may be selected, for example. The first operating layer 538 may extract very local structure edges; the second operating layer 540 may learn texture, which is a combination of edges; and the third operating layer 542 may form parts of the label-containing region 219. Each of the layers 538, 540, 542 of the CNN 535 benefit from the multichannel (e.g., multi-spectral, multi exposure information) which is provided from the HDR image processing. These computations over various input channels, such as when 3 input layers (e.g., RGB spectral components including HDR) are used, can inherently be handled and can be represented by the deep learning network. This framework naturally integrates low, mid, and high level features, and is operational to provide suitable multi-layer classification into various label configuration options 526.

In embodiments, the characterization methods comprising a CNN 535 are operational in a supervised concept where one or more operational classes (label configuration(s)) are provided as an output at 526. As an input to the CNN 535 segmentation HDR image data, which may have undergone image consolidation, of the label-containing region 219 is provided. In one or more embodiments, the image data may exclude bar code regions or font-containing regions from the classification, since they may introduce artefacts due to substantial signal blocking, i.e., they are dark.

From the stack of available images (i.e. Multispectral images taken at different exposure times), a label data subset (multi-spectral, multi-exposure data from the label containing region in 525I) to perform label counting may be provided. Typically the longer exposure times are of the most relevance, since light may go through the label 218 and produce discriminative patterns. A low number of layers of labels may appear transparent with a lower amount of light energy (corresponding to exposure time) than a higher number of layer thicknesses of labels. Structure of holder 122H or three or more labels may completely block the light (i.e. these regions may appear opaque over all exposure times). Thus, in some embodiments, regions with three or more labels or that are identified as holder 122H may be ignored and not provided as input to the interferent classifier 528.

The architecture of the CNN 535 may include various combinations of convolution layers (Conv), pooling layers (Pool), and fully-connected layers (FC—otherwise referred to herein as "inner products"). For example, one embodiment the CNN 535 may include an architecture including a convolution layer, a pooling layer, and a fully connected layer. A loss layer, such as a SoftMax S1 may be included for training the CNN 535 of FIG. 5D. For example, the loss layer may be a Soft Max since the solution of the CNN 535 is one classification selected from the plurality of label configurations (Label Config. 1-n), i.e., where confidences are provided for each channel output (channel outputs are shown as boxes 1-n) and a voting schema selects one label configuration. In some embodiments, an adapted CNN architecture may be used, such as, in order, Conv-Pool-Conv-Pool-FC. Another embodiment may include Conv-Pool-Conv-Pool-Conv-Pool-FC-FC, also taken in order. Parameters such as filter size, stride can be set as part of the parameter tuning when setting up the CNN 535.

Further, in some embodiments, the CNN 535 may include a reLU, which is a rectifier and activation function (also known as a ramp function), which enables the network to be extended. The use of the reLU as a non-linearity has been shown to enable training deep supervised neural networks without requiring unsupervised pre-training. Rectified linear units (reLU's) allow for faster and effective training of deep neural network architectures on large and complex datasets, like in the case of specimen container and specimen imaging.

One especially efficient embodiment of architecture of the CNN 535 is shown in Table 1 below, which is the same as FIG. 5C but with the SoftMax S1 not used after training. In the depicted embodiment of Table 1, a 12-channel input including three spectral responses (e.g., R,G,B) at 4 different exposure times and a patch of size 525 of 64×64 pixels is given to a convolution layer (C1) with 20 filters of size 5×5×12. The resulting 20 feature maps are then fed to a max-pooling layer (M1) which takes the max over 2×2 spatial neighborhoods with a stride of 1, separately for each channel. The purpose of this first layer 538 is to extract low-level features, especially like simple edges.

This is followed by a second convolution layer (C2) that has 20 filters of size 5×5×20, and a max-pooling layer (M2), which takes the max over 3×3 spatial neighborhoods with a stride of 2. The purpose of this second layer 540 is to learn different combination of simple edges to form texture. Thereafter, the resulting feature maps are fed into a convolution layer (C3) that has 50 filters of size 3×3×20, and a max-pooling layer (M3), which takes the max over 2×2 spatial neighborhoods with a stride of 2. This third layer 542 learns a combination of textures to form parts of the label-containing region 219. The aforementioned max-pooling layers make the output of convolution networks more robust to local translations.

Finally, the inner products (F1 and F2) are fully connected, i.e., each output unit is connected to all inputs. These inner product layers F1, F2 are able to capture correlations between parts of the label-containing region 219. The output of the last fully-connected layer F2 may be confidences for output channels 1-n (where n is the number of pre-defined label configurations (label Config 1-n)). The CNN 535 produces a distribution over the possible pre-defined label configurations 1-n.

TABLE 1

Example CNN Architecture

| Name | Type | Patch size/stride | Output size |
|------|------|-------------------|-------------|
| C1 | Convolution | 5 × 5/1 | 60 × 60 × 20 |
| M1 | Max pooling | 2 × 2/1 | 59 × 59 × 20 |
| C2 | Convolution | 5 × 5/2 | 28 × 28 × 20 |
| M2 | Max pooling | 3 × 3/2 | 14 × 14 × 20 |
| C3 | Convolution | 3 × 3/1 | 12 × 12 × 50 |
| M3 | Max pooling | 2 × 2/2 | 6 × 6 × 50 |
| F1 | Inner product | na | 500 |
| R1 | ReLU | na | 500 |
| F2 | Inner product | na | 5 |

Figure 5E:
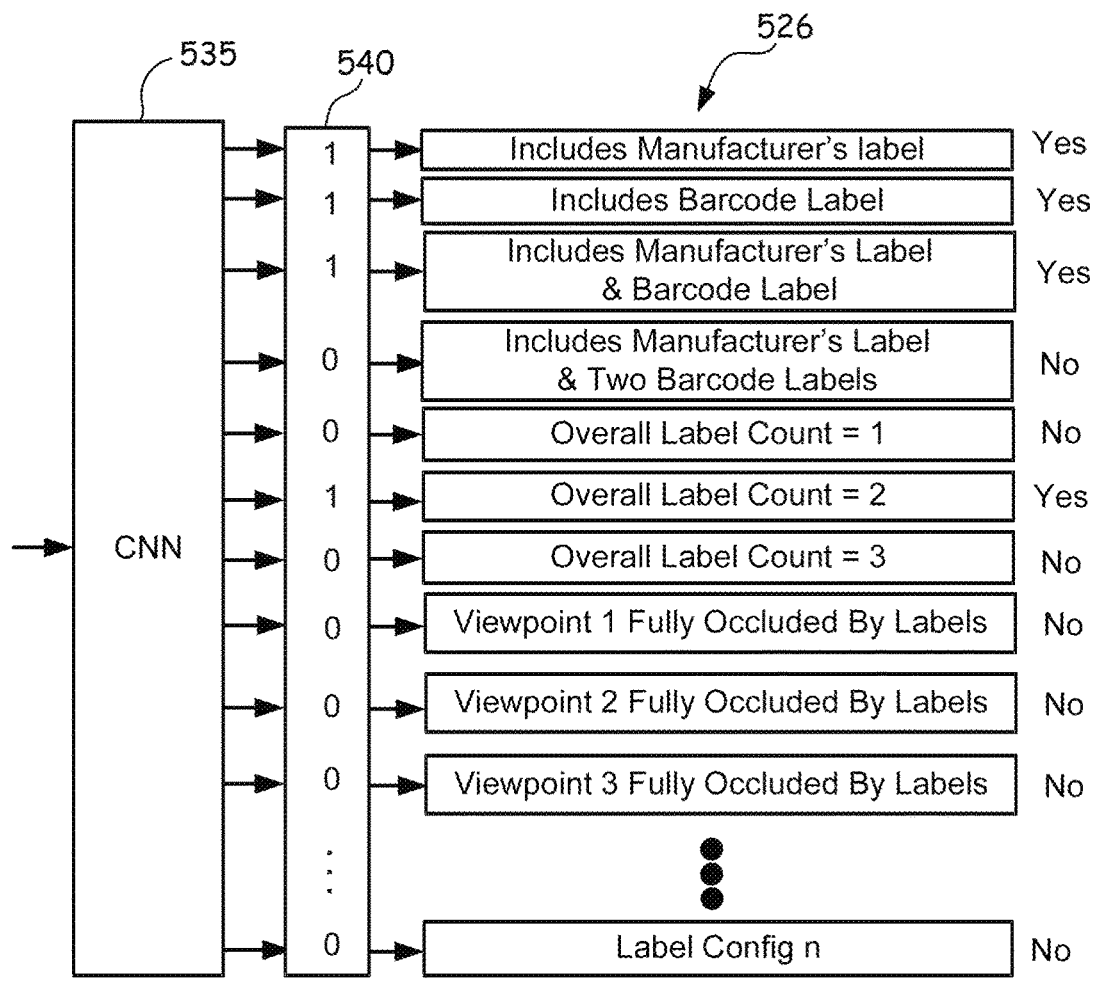
FIG. 5E illustrates a block diagram of a multiple-output architecture of another embodiment of a CNN configured to carry out characterization of a label-containing region according to one or more embodiments.

During pre-screening, the data preparation step is exactly the same as for training. A sliding window 525 is used where each patch of the label-containing region 219 is classified with the CNN 535, and each patch 523 gives a response towards one or more of the pre-defined label configuration options. Candidates are then classified as one or more of the predefined label configurations (e.g., Label Config 1-n) by a voting scheme or by output to a results vector. As shown in FIGS. 5D and 5E, two different embodiments are provided having different label configuration classification outcomes.

In the first embodiment of FIGS. 5C and 5D, the classification for the label-containing region results in one and only one label configuration outcome 526 and a confidence level for each possible outcome, normalized to one, for example. One result is provided for each viewpoint. The reported label configuration for each viewpoint is the classification having the highest confidence level (CL). The architecture of the CNN 535 in FIG. 5C is an example CNN architecture that results in one and only one outcome.

As shown in FIG. 5D, additional processing may review the confidence levels (shown normalized to 1.000) and determine the label configuration outcome. In these case shown, channel 3 has the highest confidence (0.990) and thus the selected label configuration is "Includes A Manufacturer's Label & Only One Barcode Label." If two or more outcomes have relatively high confidence levels and are approximately equal to each other, a determination may be made that more than one outcome may be true.

In the FIG. 5E embodiment, the CNN 535 may be operable to map image data input to a label configuration outcome vector 540. Thus, in this instance more than one label configuration outcome is possible. The CNN 535 may include a cross entropy loss layer or Euclidean loss during training, which may be used to learn the optimal mapping from various image data that has been input as a vector in training. In this embodiment, the training may include a feature learning procedure wherein ground truth labels may include an input vector that may look like [0,1,1,0,0,1, 1, ... , 0], where each element (1 or 0) encodes is representative of a feature of a potential label configuration outcome, wherein a 1 means that the feature is present and 0 means that no such feature is present. The vector may include any suitable number of features that will be vector output options. In this embodiment, the CNN 535 may vote for multiple outcomes encoded by the vector. The CNN 535 may operatively map image data content to the label configuration outcome vector 540. The CNN 535 can be the same as in FIG. 5C, except an additional cross entropy loss layer is added to enable the training. During training, the cross entropy loss tries to minimize the distance between the input vector and the label configuration outcome vector 540 of the CNN 535. Once properly trained the CNN 535 may be used as part of the pre-screening. During pre-screening, the image data input is operated on by the CNN 535 to produce a label configuration outcome vector 540 by accessing the response on the outputs of the last FC layer F2.

In each case, the per viewpoint results may be aggregated over the multiple viewpoints to obtain a more confident classification decision.

Again referring to FIGS. 5A and 5B, from the pixel (or patch) identification of classes in 516, a semantic map can optionally be generated in 520. The semantic map may be a 3D map that may be stored in a database in the computer 143, and may consolidate all the classifications (e.g., 1-serum or plasma portion, 2-settled blood portion, 3-tube, 4-air, 5-cap, 6-label, 7-holder, and 8-gel separator (if used)) from each viewpoint 1-3 as a function of pixel position (e.g., radial and vertical position on the specimen container 102). The semantic map generated by semantic map generation 520 can be graphically displayed in some embodiments.

From the semantic map or the raw semantic data in input line 521, a viewpoint can be selected in 522. In one embodiment, the viewpoint may be one of the viewpoints (e.g., 1-3) from which the images were captured with the image capture devices 440A-440C. In another embodiment, a synthetic viewpoint may be chosen as another viewpoint (e.g., viewpoint 4 shown in FIG. 6D) that is a lateral viewpoint in between any two adjacent lateral viewpoints (e.g., viewpoints 1-3 shown in FIG. 6D). The selected viewpoint may be a viewpoint that includes the maximum number of pixels (or patches) that have been classified as serum or plasma portion 212SP in 516.

In the case where a synthetic viewpoint is selected, two adjacent viewpoints may each include some pixels (or patches) located at adjacent image portions that are identified as serum or plasma portion 212SP in 516 and they may be sufficiently large or of approximately equal in size, and combining them may provide more relative area (i.e., pixels or patches) that are classified as serum or plasma portion 212SP. In this case, the segmentation data in 521 for each viewpoint is consolidated to construct the synthetic viewpoint data including the pixels (or patches) classified at serum or plasma portion 212SP from each respective viewpoint. In particular, better characterization of HILN may be carried out because of the relatively larger amount of classified pixels (or patches), as will be apparent from the following. In cases where a label-containing region 219 may include two or more labels, the layer thickness count in 525O may optionally be considered in selecting the viewpoint in 522t. For example, two viewpoints may be equally occluded by the label-containing region 219, but one view may have a higher label thickness count thus resulting in a higher level of light intensity blocking. Thus in this instance, layer thickness count output data in 525O may be used as an input to selecting the viewpoint in 522, and the viewpoint including less occlusion may be selected.

Once the viewpoint has been selected in 522, front view data and back view semantic data for the selected viewpoint may be identified in 524. The front view data is the semantic data from the selected viewpoint (e.g., 1, 2, 3, or 4). The back view data is the classification and corresponding position data for the back view. The back view data may be data on the pixels (or patches) that have been classified during the segmentation in 511 as being label 218 or serum or plasma portion 212SP.

Because the backlight from the light sources 444A-444C onto the backside of the specimen container 102 in each viewpoint may be blocked to some extent by the presence of the label-containing region 219 that is located on the backside, the intensities of the front view image data captured by the image capture devices 440A-440C in front view regions corresponding to the back view regions containing the label-containing regions 219 may be affected. As such, the intensities in those regions may be suspect (e.g., artificially low) and therefore should not be used directly as-is for the HILN characterizer 529, but should be appropriately adjusted and/or compensated for. Therefore, according to one or more embodiments of the disclosure, the characterization method takes into account the back view data. Moreover, the characterization method takes into the label thickness count on a pixel-by-pixel (or patch-by-patch) basis for the selected viewpoint, thus more fully compensating and accounting for the effects that the label thickness count has on light blocking in various regions of the serum or plasma portion 212SP.

Figure 6A:
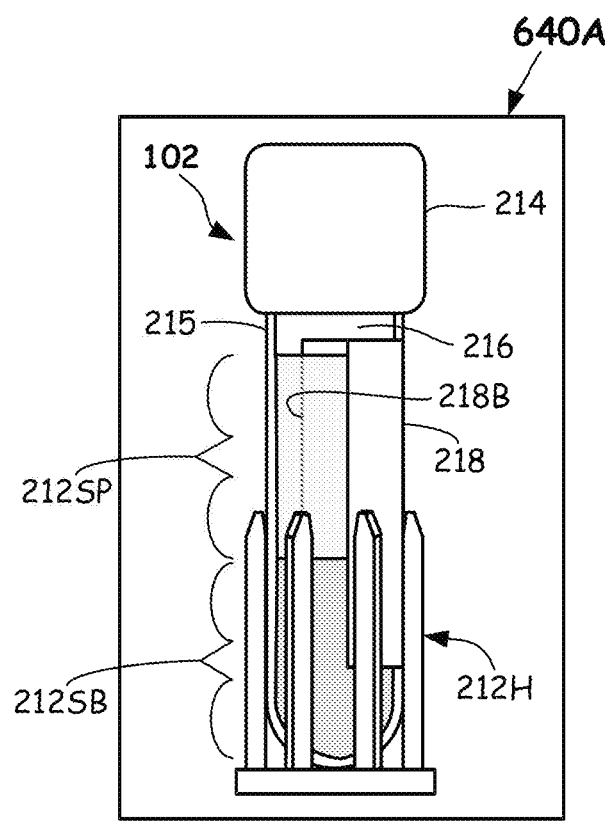
FIG. 6A illustrates a first segmented image from a first viewpoint of semantic map according to one or more embodiments.

Of course, due to the readings being suspect, one approach of taking into account the back view data might be to not use corresponding regions in the front view semantic data on regions that are classified as being label 218 in the back view semantic data when determining HILN. For example, FIG. 6A illustrates a front semantic image 640A from a first viewpoint 1 of image capture device 440A (FIG. 6D). As can be seen, some of the serum and plasma portion 212SP is shown in FIG. 6A, some is occluded by label 218, and some of the backlight emitted from light source 444A (FIG. 4A) is blocked by the back view label portion 218B (i.e., the portion of the label 218 that is located and occludes part of the backside view of the specimen container 102 in FIG. 6A). However, that approach of not using the corresponding regions may, in some instances, leave very little region classified as serum or plasma portion 212SP for analysis.

Figure 6B:
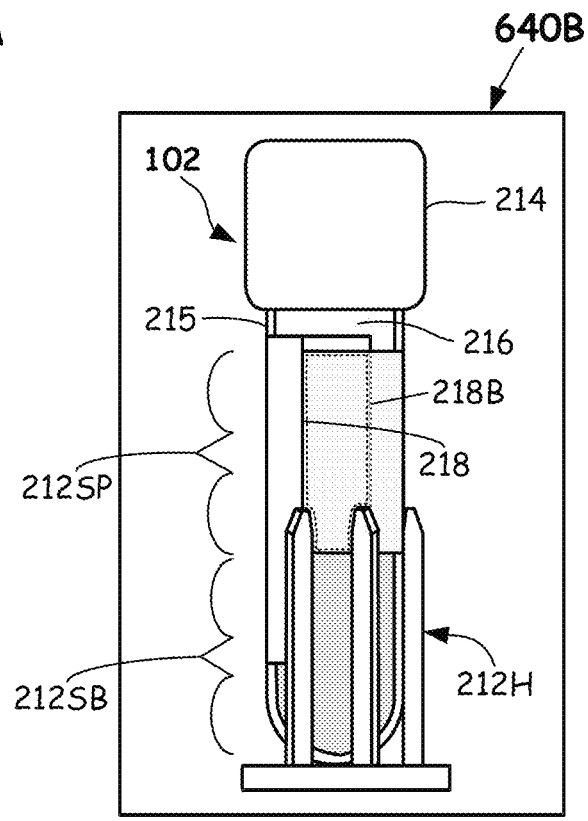
FIG. 6B illustrates a second segmented image from a second viewpoint from of a semantic map according to one or more embodiments.
Figure 6C:
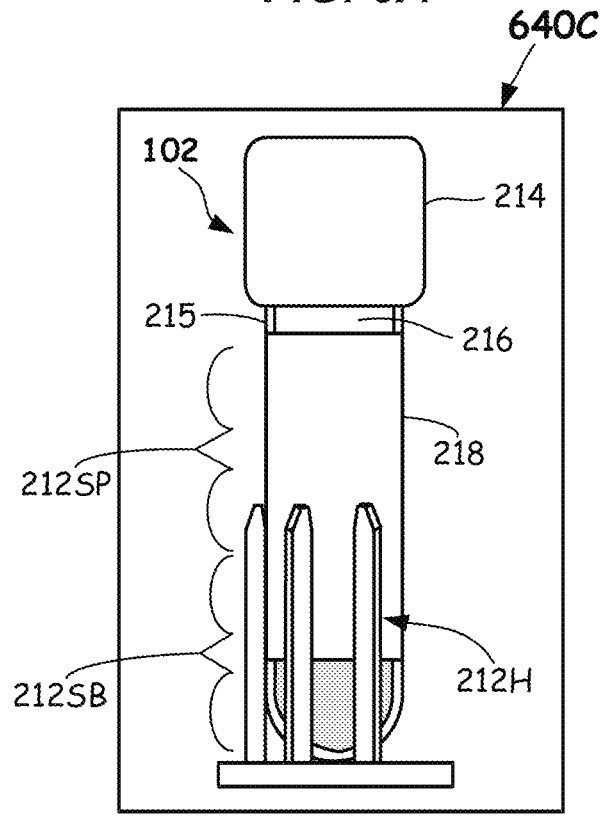
FIG. 6C illustrates a third segmented image from a third viewpoint from of a semantic map according to one or more embodiments.
Figure 6D:
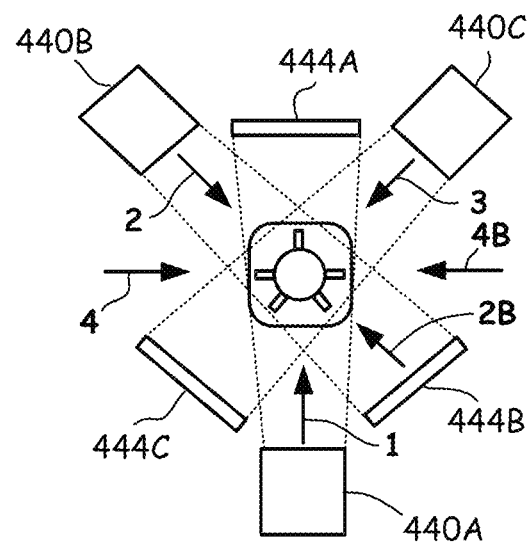
FIG. 6D illustrates a schematic top view illustrating various viewpoints according to one or more embodiments.

FIG. 6B illustrates a front semantic image 640B from a second viewpoint 2 of image capture device 440B (FIG. 6D). In FIG. 6B, some of the serum or plasma portion 212SP is occluded by label 218, and some of the backlight emitted from light source 444B (FIG. 6D) is blocked by the back view label portion 218B (i.e., the portion of the label 218 that is located on the backside of the specimen container 102 in FIG. 6B).

FIG. 6C illustrates a front semantic image 640C from viewpoint 3 of image capture device 440C (FIG. 6D). In FIG. 6C, all of the serum or plasma portion 212SP is occluded by label 218 from viewpoint 3. Thus, if the characterization method chooses the viewpoint in 522 to be one of these three viewpoints (1, 2, or 3), then the second viewpoint 2 of FIG. 6B would be chosen. This is because viewpoint 2, as illustrated in FIG. 6B, has the most pixels (or patches) that have been classified as serum or plasma portion 212SP, which may be determined from the semantic map generated in 524 or from the semantic data from the individual images in input line 521. In this case, the corresponding region in the front semantic image 640B of the serum or plasma portion 212SP that has been blocked by the label (the region shown as dotted), may be intensity adjusted by the characterization method as will be described below.

Figure 6E:
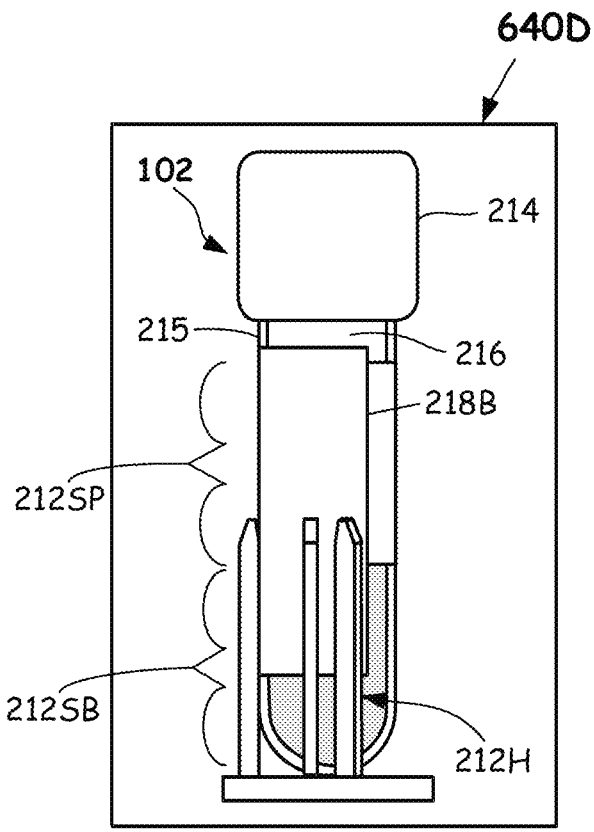
FIG. 6E illustrates a semantic back view from a synthetic viewpoint according to one or more embodiments.

A hypothetical back view semantic map 640D from viewpoint 2B is shown in FIG. 6E. This represents back view data from a viewpoint 2B (FIG. 6D) that is used to aid in intensity adjustments to the dotted portion in the front view semantic image from viewpoint 2 (FIG. 6B). In practice, there may be no semantic back view map (like FIG. 6E), but just back view semantic data that is used as an input in the characterization method.

Figure 6F:
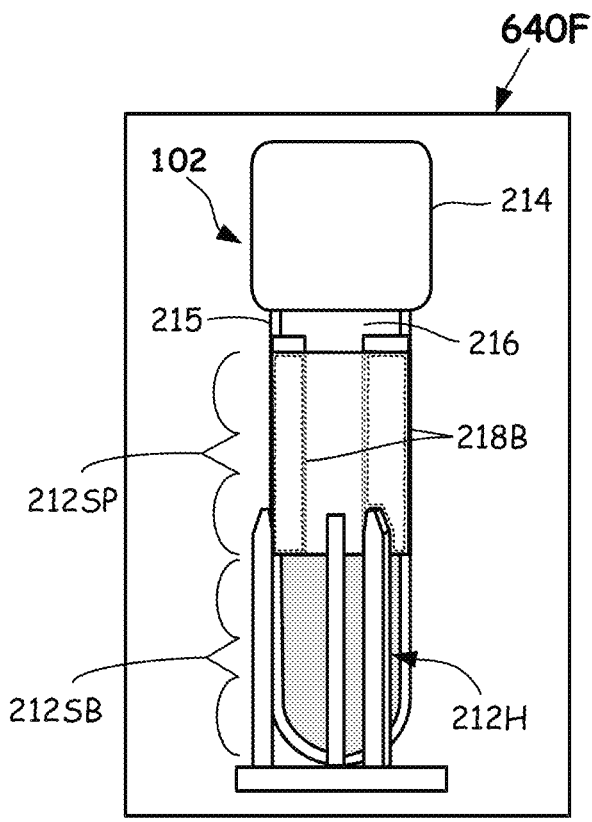
FIG. 6F illustrates a semantic front view from a synthetic viewpoint according to one or more embodiments.

In the case where the viewpoint selected in 522 is other than one of the multiple viewpoints (1-3), then a synthetic viewpoint that is a compilation of two of the other viewpoints may be selected. For example, given viewpoint 3 in FIG. 6C has the serum or plasma portion 212SP totally occluded by label 218, a viewpoint may be selected that is between viewpoints 1 and 2. This synthetic viewpoint 4 shown in FIG. 6F is a synthetic front view. This is a compilation of viewpoint 1 and viewpoint 2 and thus has approximately twice the number of pixels (as shown) that are classified as serum or plasma portion 212SP, i.e., more region or area that is classified as serum or plasma portion 212SP and is thus available for analysis. As before, in one approach, the data associated with the corresponding back view label portions 218B (shown as dotted in FIG. 6F) from the synthetic back view 4B can be intensity adjusted according to the characterization method. In this case, the data corresponding to the remaining region classified as serum or plasma portion 212SP (between the two dotted regions) obstructed by label 218B and a combined representation of the dotted region can be fed into the HILN classifier 529 along with the label count in first output line 525O.

According to embodiments of the characterization methods, an overall representation 527 may be provided based upon the front and back view data from 524 and the layer thickness count in 525O. In some embodiments, the selected viewpoint in 522 may include output data in 525O from the CNN 535 on the label thickness count. The overall representation 527 consolidates the different data streams. Depending on the type of HIL classification being undertaken in 529, the method can, for example, add numerous layers together. For example, the method may add semantic data for the selected viewpoint from front and back side in 522 and 524 to the additional data on the label thickness count in 525O on a pixel-pixel basis (or patch-by-patch basis). This may operate as an extension of a feature vector with additional cues like the number of layer thicknesses.

The generation of an overall representation 527 involves generation of pixel-by-pixel feature descriptors corresponding to occluding label regions that are, as the case may be, either in front of or in back of a serum or plasma portion 212SP, or both. Generating the overall representation 527 may involve aggregation of data on a pixel-by-pixel (or patch-by-patch) basis including aggregation of the serum or plasma data in 521 and label thickness count data in 525O. Overall representation 527 is used in the HILN determination. The overall representation 527 is supplied to the interferent characterizer 528 as an overall representation of the serum or plasma portion in 527 (including data on both occluded and un-occluded portions (if any).

In the overall representation generation in 527, any regions including barcode or indicia on the label-containing region 219 may be ignored. The barcode data regions and their locations may be readily determined based upon the segmentation 511 and/or a suitable barcode reading algorithm. Of course, the barcode data may be used for identification of the specimen 212, as discussed above.

In some embodiments, the label configuration output in 527O may be used as an input to the interferent classifier 528. This additional input may assist in adjusting the confidence level in the HIL Index level determinations.

The interferent characterizer 528 includes HILN classifier 529, which may be configured to identify if H, I, and/or L is present within the serum or plasma portion 212SP or whether no HIL is present within the serum or plasma portion 212SP and is thus normal (N). The interferent characterizer 528 may further include an interferent index generator 530 that may determine an index for any interferent (H, I, and/or L) that is detected. Therefore, effectively, the interferent classifier (e.g., HILN classifier 529), operates to classify, based on the supplied overall representation 527, including semantic data, label thickness count data whether an interferent is present within the serum or plasma portion 212SP, or is absent therefrom.

In one or more embodiments, the HILN classifier 529 may be embodied as one or more different interferent type classifiers, such as a hemolysis classifier 529H configured and adapted to identify hemolysis, an icterus classifier 529I configured and adapted to identify icterus, a lipemia classifier 529L configured and adapted to identify lipemia, and a normality classifier 529N configured and adapted to identify normality. Each classifier may be an individual binary classification model, or optionally, the HILN classifier 529 may be a multi-class classifier, such as an SVM. The result of operating on the overall representation 527 is a determination of presence of one or more interferent (H, I, and/or L) or the absence of an interferent (N) in the serum or plasma portion 212SP.

Hemolysis Detection

According to another broad aspect, embodiments of the disclosure are directed at a method and apparatus that may be used to detect if the specimen 212 contained in a specimen container 102 of centrifuged blood is hemolyzed. The method utilizes the overall representation 527 as input, which is data on pixels (or patches) that have been previously classified as serum or plasma portion 212SP and data on the occluding label-containing region including label thickness count data. This data is further operated on at 529H by a HILN classifier 529 to identify hemolysis, based upon the classifier model being previously trained with a multitude of hemolyzed specimens of different hemolytic indices. HILN classifier 529 may be, for example, an SVM, a support vector regression (SVR), or any other suitable multi-class classifier, such as a CNN.

The extent or degree of hemolysis may be characterized by a hemolytic index as determined at 530H of interferent index generator 530. Interferent index generator 530 may be, for example, a support vector regression (SVR). "Hemolytic index" as used herein means a grade given to a particular specimen 212 based upon the determined content of hemolysis present in the serum or plasma portion 212SP. The grading scale for observation ranges may range from a minimum measure to a maximum measure. For example, the measures may be discreet measures from zero through some finite value (e.g., 0-4), where zero represents substantially no hemolysis and four represents significant hemolysis. Alternately, a grading scale of 0-10, 0-20, A-F, or some other grading range could be used.

A specimen 212 having a sufficiently high hemolytic index (e.g., above a pre-determined H threshold), as determined by the quality check module 130, may be rejected. A usual procedure is to redraw another specimen 212 from the patient to ensure that a specimen 212 of good quality may be presented to the analyzer 106, 108, and/or 110 (FIG. 1). Thus, the specimen 212 exhibiting a relatively-high hemolysis index may, after the pre-screening at quality check module 130, be rejected and offloaded at loading area 105 without being further tested. Optionally, the specimen 212 may be re-tested at the quality check module 130 or at another station. Depending on the test ordered, the hemolysis index may be reported along with the test results from the one or more analyzers 106, 108, and/or 110. If the specimen 212 is found to contain a sufficiently-high index level of hemolysis at 530H, an alert may be displayed on a display (e.g., computer screen) of the computer 143 or CIM 145 of the specimen testing apparatus 100 to alert lab personnel so that they may order or undertake further evaluation, order a specimen redraw, and/or make further decisions if the specimen 212 is found to contain a possibly interfering amount of hemolysis.

To improve an ability to convey the assessment of a specimen 212 containing hemolysis to laboratory personnel, an image of the specimen container 102 including the specimen 212 having hemolysis may be displayed on a display of the computer 143 or of the CIM 145. This image may be displayed along with other collaborative information such as, but not limited to, reference images of various known hemolyzed specimens, color spectra for comparison, the assessed index level of hemolysis of the specimen 212, a layer thickness count, a number of labels (label count), whether fully occluded by labels, and/or a suggested action for the laboratory personnel to take. Other collaborative information may be displayed.

Icterus Detection

According to another broad aspect of the method, embodiments of the disclosure are directed at a method and apparatus that may be used to detect icterus in a serum or plasma portion 212SP contained in a specimen container 102 of centrifuged blood. An icterus interferent may arise, for example, from an excess of bilirubin resulting from decaying red blood cells being converted into bilirubin in the spleen. Levels of bilirubin above 2-3 mg/dl are visibly dark yellowish or brownish in color and may adversely affect any enzyme-based immunoassays carried out on the analyzers (e.g., analyzers 106, 108, and/or 110). Such a condition is also termed bilirubinaemia.

The icterus detection method is similar to that for detecting hemolysis. After image capture and performing an analysis of the pixelated images to provide segmentation in 511, the serum or plasma data including the improved feature characterizations, which has taken into account the occlusion by label and the label thickness count, may be analyzed for the presence of icterus. According to the method, the same data that was operated on for the hemolysis detection may be supplied to the identify icterus with an icterus classifier at 529I. The analysis may use a properly-trained binary or multi-class classifier to determine if icterus is present. Any suitable classifier may be used, such as an SVM, a support vector regression (SVR), or any other suitable classifier, such as a CNN.

If icterus is detected, the interferent level detector 529I may determine an interferent level, such as an icteric index. "Icteric index" as used herein means the grade given to a particular specimen 212 based upon the determined content of icterus present. The grading scale for observation may range from a minimum to a maximum measure, such as from zero through a maximum measure (e.g., 0-4). Zero represents substantially no icterus, while four represents significant presence of icterus. Alternately, other grading scales could be used, such as 0-10, 0-20, A-F, or some other range.

Lipemia Detection

According to another broad aspect, embodiments of the disclosure are directed at a method and apparatus that may be used to detect lipemia in a specimen 212 contained in a specimen container 102 of centrifuged blood. A lipemia interferent, which may exhibit a whitish appearance in the serum or plasma portion 212SP, may arise from the presence of excess lipids in the blood. Lipid levels above about 50 mg/dl may interfere with antibody binding in immunoassay testing and may therefore affect an immunoassay result from the analyzer 106, 108, or 110.

The lipemia detection method is similar to that for detecting hemolysis and icterus. From the segmentation 511 and the CNN and other processing discussed above, an overall representation 527 may be operated on to determine the presence of lipemia using a lipemia classifier at 529I. According to the method, the same semantic data that was used for the hemolysis and icterus detection may be operated on to determine the presence of lipemia. The analysis may determine if a lipemia interferent is present by using a trained L classifier model to identify lipemia at 529L. Any suitable binary or multi-class classifier may be used, such as an SVM, a support vector regression (SVR), or any other suitable classifier, such as a CNN.

If Lipemia (L) is identified at 529I, then an interferent level, such as a lipemic index may be determined at 526L. Lipemic index is grade given to a serum or plasma portion 212SP based upon the determined content of lipemia therein.

The grading scale may range from a minimum to a maximum value (e.g., zero through four (0-4)). Zero represents substantially no lipemia, while four represents significant presence of lipemia. Alternately, other grading scales could be used, such as 0-10, 0-20, A-F, or some other range. Lipemia is a specific sample quality discoloration defect, which may be resolved with special processing. Thus, once identified at a quality check module 130, and before the specimen 212 is tested or analyzed on an analyzer (e.g., analyzer 106, 108, 110), the specimen 212 may be sent to another location (e.g., to remote station 132) for further processing.

The further processing the specimen 212 may involve one or more operations to remove or reduce an amount of lipid in the serum or plasma portion 212SP. For example, the processing may introduce a solvent or other material to reduce the amount of lipemia. Following the additional processing to lower the lipemia level (i.e., to lower the lipemic index), the specimen 212 can be returned to the track 121 and may be placed directly on an analyzer (e.g., analyzer 106, 108, 110) for analysis. Optionally, the specimen 212 may again be routed to the quality check module 130 so to rescreen the specimen for lipemia in accordance with the method disclosed herein. If the lipemia index is now sufficiently low, and determined to be normal (N), then the specimen may be routed on track 121 directly to be analyzed on the one or more analyzer (e.g., analyzer 106, 108, or 110). Thereafter, the specimen 212 may be returned to the loading area 105 for offloading from the track 121.

Normality Detection

In accordance with a one aspect, the specimen 212 may first be processed to determine if the serum or plasma portion 212SP may be identified as being normal (N), i.e., lacking any indication of H, I, and L, by quality check module 130 via normality classifier at 529N. In some cases, the method 500 may forego analysis for H, I, and L if the serum and plasma portion 212SP is identified as being normal (N) at 529N. Accordingly, if N, then the specimen 212 it may be successfully analyzed at the one or more analyzers (e.g., analyzers 106, 108, and/or 110) without confidence that there is no interferent contained therein.

According to the method 500, the same data set that was described for use for the previously-described H, I, and L detection may be operated on to determine N. A trained binary normality classifier may be used to determine normality in 529N. Any suitable binary or multi-class classifier may be used, may be, for example, an SVM, a support vector regression (SVR), or any other suitable classifier, such as a CNN.

According to the method 500, individual binary classifiers may be used for each of H, I, L, and N. Optionally, a multi-class classifier may be used for identifying any one or more of H, I, L, or N. The multi-class classifier (e.g., a four class classification model) may be a support vector machine (SVM), support-vector network, or a boosting class algorithm, a CNN, and the like.

A determination that the serum or plasma portion 212SP is, as a whole, characterized as including H, I, and/or L, or N may be accomplished by adding a number of pixels (or patches) in the serum or plasma portion 212SP that have been classified by the HILN classifier 529 as being N, H, I, or L. The classification as normal (N) or as containing an interferent may be based upon a largest number of pixels (or patches) in each class, or a suitable weighting scheme in some embodiments.

Thus, in one embodiment, if a majority of pixels (or patches) are classified as N, then the serum or plasma portion 212SP may be categorized as normal (N). If a majority of pixels (or superpixels/image patches) are classified as H, then the serum or plasma portion 212SP may be categorized as containing hemolysis (H). Likewise, if a majority of pixels (or patches) are classified as I or L, then the serum or plasma portion 212SP may be categorized as Icterus (I), or lipemia (L), respectively. In other embodiments, a weighted majority voting scheme may be also used to classify the specimen 212 using probabilities or confidences from the HILN classifier 529 as a weight. Other means for characterizing the serum or plasma portion 212SP, as a whole, may be used.

Moreover, if the data set contains a relatively large amount of pixels (or patches) that are classified in two or more interferent classes (e.g., H and I, H and L, I and L, or even H, I, and L), then the interferent detection method may report that multiple interferent types are present. Once the specimen 212 has been given a characterization as containing multiple interferent types (e.g., H, I, and/or L), the interferent level detector 530 may be used to provide an interferent level for the multiple interferent types in the serum or plasma portion 212SP. Interferent level detector 530 may obtain an interferent index for each particular interferent by passing the data set through a level characterizing model, such as a supervised regression model. Any suitable regression model may be used, such as support vector regression (SVR), neural network regression, tree-based regression, or the like.

A different regression model may be used for each interferent type, such as hemolysis regression model 530H, icterus regression model 530I, and lipemia regression model 530L. In one or more embodiments, each of the regression models may be an SVR machine and may be trained using liquid regions that exhibit that particular type of interferent type (e.g., H, I, or L). For example, the hemolysis regression model 530H may be trained with a broad range of specimens 212 having hemolysis levels across a diverse range of expected hemolysis levels. Likewise, the icterus regression model 530I may be trained with a broad range of specimens 212 having icterus levels across a diverse range of expected levels. Similarly, lipemia regression model 530L may be trained with a broad range of specimens 212 having lipemia levels across a diverse range of expected levels. In some embodiments, the interferent levels may be discretized. For example, four discreet levels may be used. More or less than four discreet levels may be used. If the interference levels of the models have been discretized, then the output from the regression models may also be discretized by mapping to the closest target level. In any event, according to one or more embodiments, an interferent index may be provided for each detected interferent type.

Accordingly, it should be apparent that the methods carried out by the quality check module 130 may result in a rapid characterization of the specimen 212 as being either normal N or as containing one or more interferent HIL therein. If the specimen 212 contains one or more interferent, then the method may further determine the interferent type or types present, and may also determine an interferent index for each interferent type present.

Figure 7:
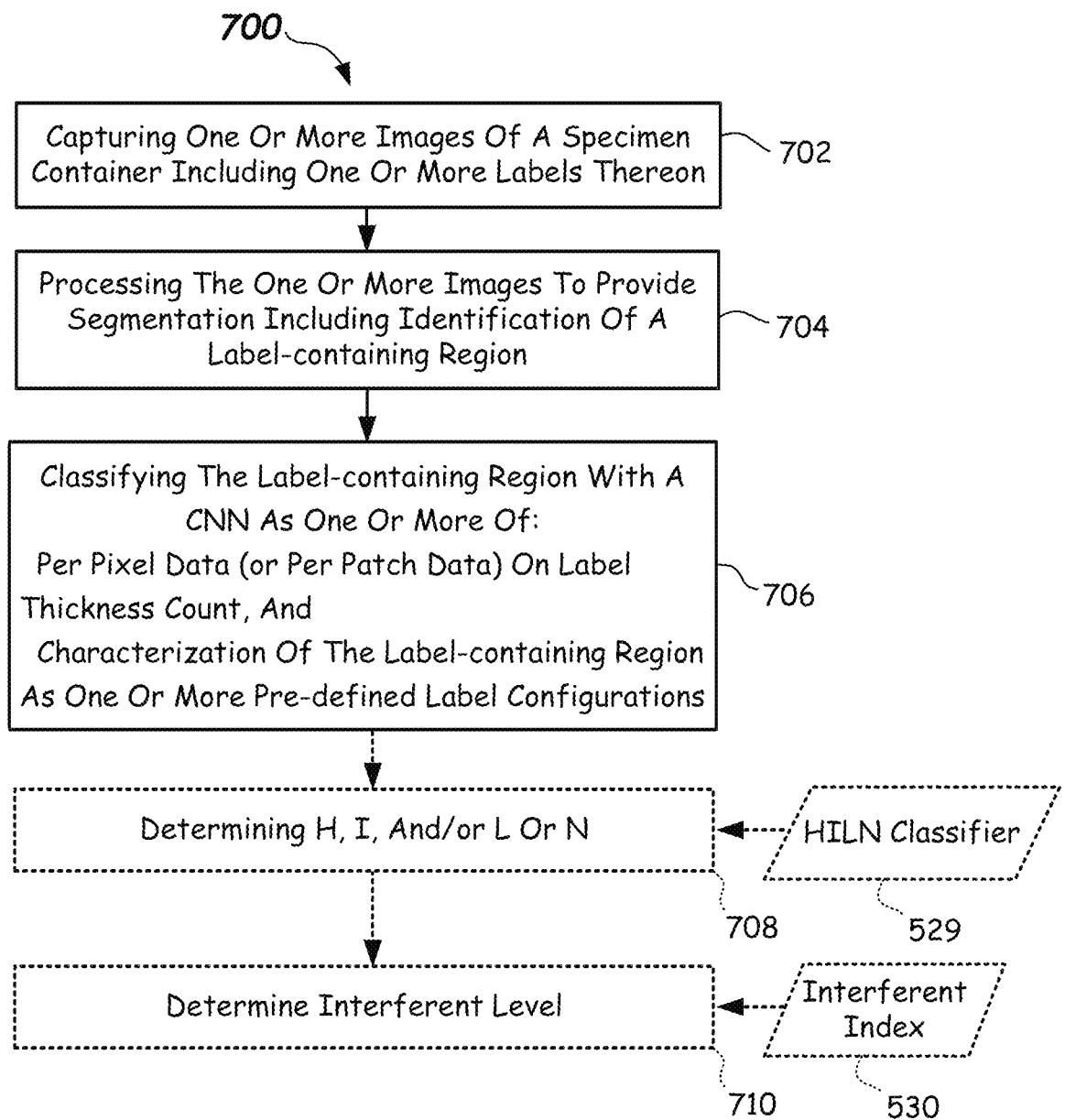
FIG. 7 is flowchart of a characterization method and optional HILN detection method according to one or more embodiments.

FIG. 7 illustrates a flowchart of a characterization method 700. The characterization method 700 may be carried out with a quality check module 130 as described herein, and/or in the specimen testing apparatus 100 as described herein. In particular, the characterizing method 700 may be a precursor or a part of a method of determining an interferent in a specimen 212 according to one or more embodiments. The characterization method 700 includes, in 702, capturing one or more images from multiple viewpoints (e.g., viewpoints 1, 2 and 3) of a specimen container (e.g., specimen container 102) including a serum or plasma portion (e.g., serum or plasma portion 212SP) of a specimen (e.g., specimen 212), wherein the specimen container includes one or more labels (e.g., label 218, 218A and 218B, or 218A-218C) thereon. The one or more images may be digital, pixelated images captured using one or more image capture devices (e.g., image capture devices 440A-440C).

The characterization method 700 further includes, in 704, processing the one or more images from the multiple viewpoints to provide segmentation. The segmentation 511 may include multi-spectral, multi-exposure data for each of the multiple viewpoints, and wherein the segmentation includes identification of a label-containing region (e.g., label-containing region 618). The multiple images may include multiple images at each viewpoint at different exposures and/or at different spectra (e.g., R, G, B, white light, IR, and/or near IR, or subsets thereof). For example, there may be 4-8 different exposures or more taken at different exposure times in some embodiments, but under the same lighting conditions. In one or more embodiments, some images may be captured using white light as the backlighting light source 444A-444C and some may be captured using a plurality of single-wavelength peak, narrow-band spectral light sources, such as red, blue and green as backlit light sources 444A-444C. Optionally, IR or near IR light sources may be used as backlighting sources.

The segmentation data may be obtained using HDR imaging as described herein and segmentation (e.g., segmentation 511) may be accomplished by a suitable model-based method, such as the classification method described herein wherein the image data is segmented into various classes, such as serum or plasma portion, settled blood portion, tube, air, cap, label, holder, and gel separator (if used). In particular, the label-containing region 219 containing the label(s) is identified in the segmentation 511 is used by the characterization method 700.

In particular, the characterization method includes, in 706, classifying the label-containing region (e.g., label-containing region 219) with a CNN (e.g., CNN 535) as one or more of:
per pixel data (or per patch data) on label thickness count, and
characterization of the label-containing region as one or more of pre-defined label configurations.

The per pixel data (or per patch data) on label thickness count and/or the characterization of the label-containing region 219 as well as the data on the serum or plasma portion may be presented to an interferent characterizer 539. In 708, there may be undertaken a determining of H, I, and/or L or N based upon this data input from the overall characterization 527 as operated on by the HILN classifier 529. It should be apparent that the HILN determination is based on front view semantic data from the front view as processed with the HILN classifier 529, while taking into account the portions of the serum or plasma portions 212SP that are occluded by the label-containing region 219 and the label thickness count thereof.

Optionally, in 710, an interferent level (e.g., H, I, and/or L index) may be detected, such as by using an interferent index model discussed above. Accordingly, based on the foregoing it should be apparent that the characterization method 700 provides a better characterization of the serum or plasma portion 212SP by adjusting the image data to account for the presence of both labels and label thicknesses that may occlude the one or more viewpoints. The improved characterization may be used to provide a rapid and robust characterization of a presence of H, I, and/or L, or N of the specimen 212, and if an interferent (e.g., H, I, and/or L) is detected, an interferent level may be assessed and reported.

Various selected components, features, or embodiments may be described individually herein. It should be noted that such components, features, or embodiments may be used in substitution with other individually-described components, features, or embodiments, or even in combination with other described components, features, or embodiments herein, as is practical. While the invention is susceptible to various modifications and alternative forms, specific apparatus, system, and methods have been shown by way of example in the drawings and are described in detail herein. It should be understood, however, that it is not intended to limit the disclosure to the particular apparatus, systems, and methods disclosed but, to the contrary, to cover all modifications, equivalents, and alternatives falling within the scope of the appended claims.

What is claimed is:

1. A characterization method, comprising:
capturing images of a specimen container including a serum or plasma portion of a specimen, the specimen container including one or more labels provided thereon;
processing the images to provide segmentation data including identification of a label-containing region;
classifying the segmentation data on the label-containing region with a convolutional neural network; and
outputting from the convolutional neural network one or more of:
per pixel data (or per patch data) on label thickness count, and
characterization of the label-containing region as one or more of pre-defined label configurations.

2. The method of claim 1, wherein the one or more labels includes a manufacturer label, one or more barcode labels, or both.

3. The method of claim 1, wherein the classifying the segmentation data on the label-containing region with a convolutional neural network comprises:
providing data to the convolutional neural network about the label-containing region.

4. The method of claim 1, wherein characterization of the label-containing region as one or more of the pre-defined label configurations comprises:
determining if there is a manufacturer's label on the specimen container.

5. The method of claim 1, wherein characterization of the label-containing region as one or more of the pre-defined label configurations comprises:
determining if there is a barcode label on the specimen container.

6. The method of claim 1, wherein characterization of the label-containing region as one or more of the pre-defined label configurations comprises:
determining there is a manufacturer's label and a barcode label on the specimen container.

7. The method of claim 1, wherein characterization of the label-containing region as one or more of the pre-defined label configurations comprises:
determining there is a manufacturer's label and two barcode labels on the specimen container.

8. The method of claim 1, wherein characterization of the label-containing region as one or more of the pre-defined label configurations comprises:

determining an overall label count on the specimen container.

9. The method of claim 8, comprising rejecting the specimen container when the label count is equal to or above a predefined threshold label count.

10. The method of claim 1, wherein characterization of the label-containing region as one or more of the pre-defined label configurations comprises:
determining if one or more viewpoints are fully occluded by the label-containing region.

11. The method of claim 1, wherein characterization of the label-containing region as one or more of the pre-defined label configurations comprises:
determining there is one barcode label on the specimen container, and the one barcode label covers at least some of a manufacturers label on the specimen container.

12. The method of claim 1, wherein characterization of the label-containing region as one or more of the pre-defined label configurations comprises:
determining there are two barcode labels on the specimen container, a covered barcode label and one that is a fully-visible barcode label, wherein the fully-visible barcode label covers at least some of the covered barcode label, and the covered barcode label covers at least some of a manufacturers label on the specimen container.

13. The method of claim 1, wherein characterization of the label-containing region as one or more of the pre-defined label configurations comprises:
determining there are three barcode labels on the specimen container, a first covered barcode label, a second covered barcode label, and one that is a fully-visible barcode label, wherein the fully-visible barcode label covers at least some of the second covered barcode label, and the second covered barcode label covers at least some of the first covered barcode label, and the covered barcode label covers at least some of a manufacturer's label on the specimen container.

14. The method of claim 1, wherein characterization of the label-containing region as one or more of the pre-defined label configurations comprises:
determining there is one visible barcode label on the specimen container, and that other labels together with the one visible barcode label fully occlude the serum or plasma portion around an entire circumference of the specimen container.

15. The method of claim 1, wherein the convolutional neural network includes an architecture including a convolution layer, a pooling later, and a fully-connected layer.

16. The method of claim 1, wherein the capturing the one or more images comprises backlighting one or more viewpoints with light sources comprising one or more spectra of R, G, B, white light, IR, and near IR.

17. The method of claim 1, wherein the capturing the one or more images is from multiple viewpoints and with multiple exposures for each of multiple spectra.

18. The method of claim 1, wherein barcode data in the segmentation data of the label-containing region is ignored.

19. A quality check module, comprising:
a plurality of image capture devices arranged around an imaging location, and configured to capture multiple images of a specimen container, including one or more labels and containing a serum or plasma portion of a specimen, from multiple viewpoints; and
a computer coupled to the plurality of image capture devices and adapted to process image data of the multiple images, the computer configured and capable of being operated to:
capture images of the specimen container, the serum or plasma portion, and the one or more labels,
process the images to provide segmentation data including identification of a label-containing region,
classify the label-containing region with a convolutional neural network, and
output from the convolutional neural network one or more of:
per pixel data (or per patch data) on label thickness count, and
characterization of the label-containing region as one or more of pre-defined label configurations.

20. A specimen testing apparatus, comprising:
a track;
a carrier moveable on the track and configured to contain a specimen container containing a serum or plasma portion of a specimen, the specimen container including one or more labels thereon;
a plurality of image capture devices arranged around the track and configured to capture multiple images of a specimen container, the one or more labels, and the serum or plasma portion of the specimen, from multiple viewpoints; and
a computer coupled to the plurality of image capture devices and adapted to process image data of the multiple images, the computer configured and capable of being operated to:
capture images of the specimen container, the serum or plasma portion, and the one or more labels,
process the images to provide segmentation data including identification of a label-containing region,
classify the label-containing region with a convolutional neural network, and
output from the convolutional neural network one or more of:
per pixel data (or per patch data) on label thickness count, and
characterization of the label-containing region as one or more of pre-defined label configurations.

* * * * *